United States Patent
Fanini et al.

(10) Patent No.: US 9,683,438 B2
(45) Date of Patent: Jun. 20, 2017

(54) COMMUNICATION BETWEEN DOWNHOLE TOOLS AND A SURFACE PROCESSOR USING A NETWORK

(71) Applicants: Otto N. Fanini, Houston, TX (US); Harold Andrade, Houston, TX (US)

(72) Inventors: Otto N. Fanini, Houston, TX (US); Harold Andrade, Houston, TX (US)

(73) Assignee: Baker Hughes Incorporation, Houston, TX (US)

( * ) Notice: Subject to any disclaimer, the term of this patent is extended or adjusted under 35 U.S.C. 154(b) by 257 days.

(21) Appl. No.: 14/490,298

(22) Filed: Sep. 18, 2014

(65) Prior Publication Data

US 2016/0084076 A1   Mar. 24, 2016

(51) Int. Cl.
*G01V 3/00* (2006.01)
*E21B 47/12* (2012.01)
(Continued)

(52) U.S. Cl.
CPC .............. *E21B 47/12* (2013.01); *H04L 67/12* (2013.01); *H04L 69/08* (2013.01)

(58) Field of Classification Search
None
See application file for complete search history.

(56) References Cited

U.S. PATENT DOCUMENTS 5,515,038 A   5/1996 Smith
5,539,375 A   7/1996 Atherton
(Continued)

FOREIGN PATENT DOCUMENTS

CN   202383262 U   8/2012
CN   101832152 B   9/2012
(Continued)

OTHER PUBLICATIONS

Cubillos et al., "Using of H-Infinity Control Method in Attitude Control System of Rigid-Flexible Satellite", Hindawi Publishing Corporation, Mathematical Problems in Engineering, vol. 2009, Article ID 173145, 9 pages, doi:10.1155/2009/173145.
(Continued)

*Primary Examiner* — Brian Zimmerman
*Assistant Examiner* — Thomas McCormack
(74) *Attorney, Agent, or Firm* — Cantor Colburn LLP

(57) ABSTRACT

A system for communicating with subsurface components includes: a surface host connected to a subsurface location; a subsurface host connected to the surface host by a communication link, the subsurface host configured to communicate with the surface host using a communication protocol; and a plurality of tools configured to be disposed in a borehole, the plurality of downhole tools communicatively coupled to the subsurface host via a communication network. The communication network is divided into a plurality of network subsets, each network subset of the plurality of network subsets including one or more downhole tools, all of the one or more downhole tools configured to communicate using a common protocol, each network subset including a network device configured to receive data and translate the data to the common protocol, the common protocol of one network subset being different than the common protocol of at least one other network subset.

19 Claims, 18 Drawing Sheets

(51) Int. Cl.
  *H04L 29/08* (2006.01)
  *H04L 29/06* (2006.01)

(56) References Cited

U.S. PATENT DOCUMENTS

| | | | |
|---|---|---|---|
| 5,572,182 | A | 11/1996 | De Pinho Filho et al. |
| 6,195,425 | B1 | 2/2001 | Farris |
| 6,353,614 | B1 | 3/2002 | Borella et al. |
| 6,369,718 | B1 | 4/2002 | Mathieu |
| 6,492,898 | B1 | 12/2002 | Sabbattini et al. |
| 6,587,037 | B1 | 7/2003 | Besser et al. |
| 6,937,159 | B2 | 8/2005 | Hill et al. |
| 7,167,081 | B2 | 1/2007 | Strumpf et al. |
| 7,218,244 | B2 | 5/2007 | Jin et al. |
| 7,248,178 | B2 | 7/2007 | Layton |
| 7,268,670 | B2 | 9/2007 | Robertson |
| 7,526,953 | B2 | 5/2009 | Goodwin et al. |
| 7,963,327 | B1 | 6/2011 | Saleri et al. |
| 8,184,014 | B2 | 5/2012 | Hernandez-Marti |
| 8,195,864 | B2 | 6/2012 | Whitby-Strevens et al. |
| 8,280,638 | B2 | 10/2012 | Brooks |
| 8,560,713 | B2 | 10/2013 | Moreira Sa De Souza et al. |
| 8,645,571 | B2 | 2/2014 | Downton et al. |
| 8,667,091 | B2 | 3/2014 | Almadi et al. |
| 2004/0139149 | A1 | 7/2004 | De Sousa |
| 2004/0246108 | A1 | 12/2004 | Robertson |
| 2007/0188344 | A1* | 8/2007 | Hache .................. E21B 47/12 340/853.1 |
| 2009/0229820 | A1 | 9/2009 | Saeed et al. |
| 2010/0194584 | A1* | 8/2010 | Savage ................ G01V 11/002 340/853.1 |
| 2010/0194585 | A1 | 8/2010 | Skinner et al. |
| 2011/0088890 | A1 | 4/2011 | Clark |
| 2012/0263243 | A1 | 10/2012 | Fallet et al. |
| 2013/0297757 | A1* | 11/2013 | Han .................... H04L 41/0806 709/222 |
| 2014/0006398 | A1 | 1/2014 | Johnson et al. |
| 2014/0292530 | A1* | 10/2014 | Weerasinghe ........ E21B 47/122 340/854.7 |

FOREIGN PATENT DOCUMENTS

| | | |
|---|---|---|
| WO | 9623368 A1 | 8/1996 |
| WO | 2008118484 A1 | 10/2008 |

OTHER PUBLICATIONS

Faure, Jean-Philippe; "The Realities of IEEE 1901's Ratification"; IEEE Smart Grid, May 2011; 3 pages.

Goldfisher, et al., "IEEE 1901 Access System: An Overview of Its Uniqueness and Motivation"; IEEE Communcations Magazine, Oct. 2010; pp. 150-157.

Prakash, "Multivariable Control of the Space Shutrle Remote Manipulator System Using H2 and H00 Optimazation", Massachusetts Institute of Technology, May 1991, 124 pages.

Rosenhagen, "From islands to clouds: the data evolution", Drilling Contractor, Sep. 21, 2011, 8 pages.

* cited by examiner

Network Model Layers: OSI Model

OSI Model

| | Data unit | Layer | Function |
|---|---|---|---|
| Host layers | Data | 7. Application | Network process to application |
| | | 6. Presentation | Data representation, encryption and decryption, convert machine dependent data to machine independent data |
| | | 5. Session | Interhost communication, managing sessions between applications |
| | Segments | 4. Transport | Reliable delivery of packets between points on a network. |
| Media layers | Packet/Datagram | 3. Network | Addressing, routing and (not necessarily reliable) delivery of datagrams between points on a network. |
| | Bit/Frame | 2. Data link | A reliable direct point-to-point data connection. |
| | Bit | 1. Physical | A (not necessarily reliable) direct point-to-point data connection. |

FIG.3

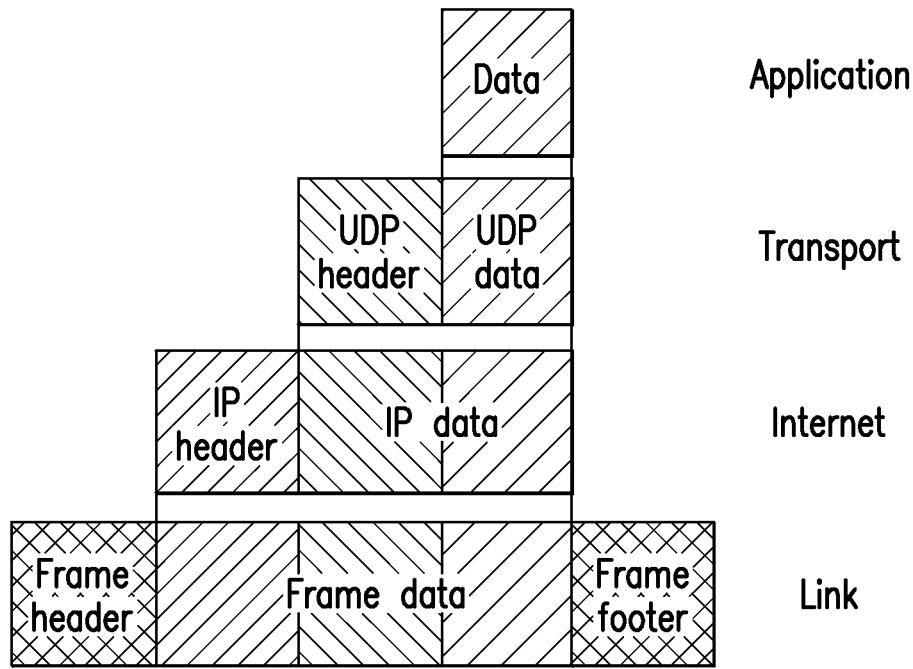
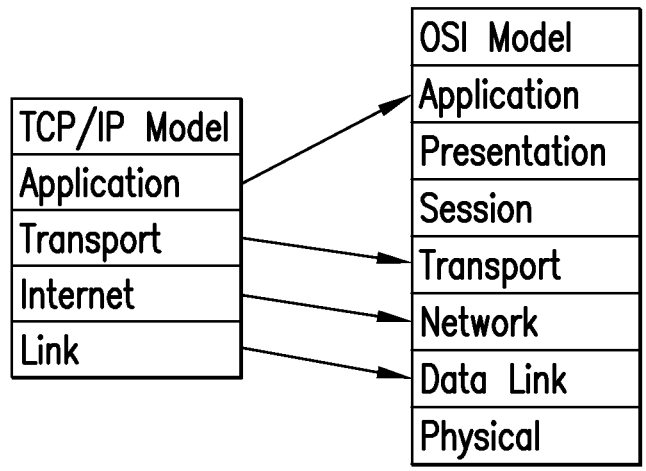
FIG.4

COMMUNICATION BETWEEN DOWNHOLE TOOLS AND A SURFACE PROCESSOR USING A NETWORK

BACKGROUND

Exploration and production of hydrocarbons require a number of diverse activities from various engineering fields to be performed in a borehole penetrating an earth formation. Typically, exploration involves surveying and performing measurements known as logging using a survey or logging tool. Production generally involves activities such as drilling, installing permanent installations, casing perforation, hydraulic fracturing, formation evaluation, well integrity surveys, well stimulation, production logging, pressure pumping and cement evaluation. In general, each of the different tools used in production requires a surface control module to record data and/or operate the tool, and typically some of the tools utilize different communication protocols. This can contribute to complexity of wirelines or other borehole strings, and can also provide an opportunity for errors.

BRIEF SUMMARY

An embodiment of a system for communicating with subsurface components includes: a surface host connected to a subsurface location; a subsurface host connected to the surface host by a communication link, the subsurface host configured to communicate with the surface host using a communication protocol; and a plurality of tools configured to be disposed in a borehole in an earth formation, the plurality of downhole tools communicatively coupled to the subsurface host via a communication network. The communication network is divided into a plurality of network subsets, each network subset of the plurality of network subsets including one or more downhole tools, all of the one or more downhole tools configured to communicate using a common protocol, each network subset including a network device configured to receive data and translate the data to the common protocol, the common protocol of one network subset being different than the common protocol of at least one other network subset.

An embodiment of a method of communicating with subsurface components includes: sending data from a surface host to a subsurface host over a communication link, the data sent to the subsurface host using a communication protocol, the data intended for a downhole tool of a plurality of downhole tools, the plurality of downhole tools configured to be disposed in a borehole in an earth formation, the plurality of downhole tools communicatively coupled to the subsurface host via a communication network; receiving the data at the subsurface host; and routing the data to one or more of a plurality of network subsets, each network subset of the plurality of network subsets including one or more downhole tools, all of the one or more downhole tools configured to communicate using a common protocol, each network subset including a network device configured to receive data and translate the data to the common protocol, the common protocol of one network subset being different than the common protocol of at least one other network subset.

BRIEF DESCRIPTION OF THE DRAWINGS

The following descriptions should not be considered limiting in any way. With reference to the accompanying drawings, like elements are numbered alike:

FIG. 3 depicts an exemplary model describing network layers;

FIG. 4 depicts another exemplary model describing network layers;

DETAILED DESCRIPTION

A detailed description of one or more embodiments of the disclosed apparatus and method presented herein by way of exemplification and not limitation with reference to the figures.

Systems, apparatus and methods are provided herein that utilize a network to communicate between a surface processor and downhole tools or other downhole components. The network also allows communication between downhole tools and components. An embodiment of a system includes a surface host connected to a subsurface host disposed in a borehole string or other carrier. A plurality of downhole tools are communicatively connected to the subsurface host or a network device. The surface host and/or subsurface host may be connected to various types of tools or devices, which are configured as network nodes. For example, the network is connected to surface nodes such as surface processing or control units, databases and others. In one embodiment, the surface and/or subsurface host is connected to various local and/or remote clients (e.g., downhole devices configured as clients, and surface devices configured as remote and/or local clients). The network is divided into a plurality of network subsets (e.g., a subnetwork or sub-net), each subset including a network device (e.g., the subsurface host or a router) that communicates with one or more downhole tools using a common protocol. The common protocol of at least one of the subsets is different than the common protocol of another subset. A network device in each subset is configured to receive data from the surface host and translate the data to the protocol by which tools in its respective subset communicates.

In one embodiment, the subsets are arranged along a communication path formed by links in the network. In instances where the surface host transmits data to multiple tools located in different subsets, the surface host generates a data structure (e.g., a packet, datagram or frame) that includes data sets intended for multiple subsets. A data set for a subset located further along the communication path (away from the source) is encapsulated or nested within a data set for a preceding subset.

The nodes and devices are configured, in one embodiment, to execute a network level algorithm, which involves sequential and parallel processor execution steps involving one or multiple nodes. One or more of the execution steps includes network communication and routing sequences.

Figure 1:
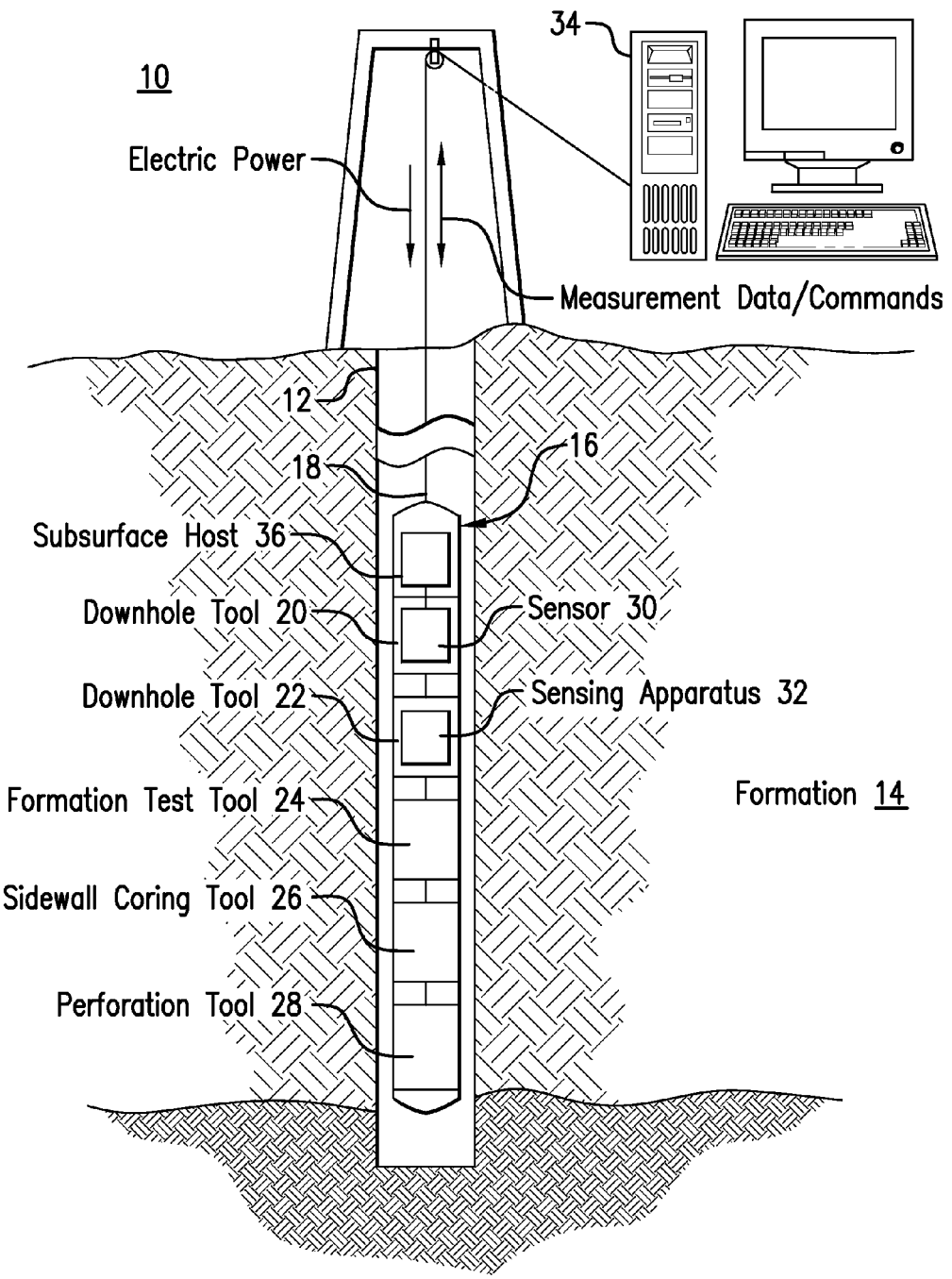
FIG. 1 illustrates a cross-sectional view of an exemplary embodiment of a plurality of downhole tools conveyable by a wireline in a borehole penetrating the earth.

FIG. 1 illustrates an exemplary embodiment of a system 10 for performing energy industry operations such as drilling a borehole 12 in an earth formation 14, formation measurement and/or evaluation, hydrocarbon production, completion and/or stimulation. The system 10 includes a borehole string or tool string 16 configured to deploy an assembly of downhole components in the borehole 12. The downhole components may be deployed using any suitable carrier, such as a drill string, a wireline 18 or a completion and production string. The wireline may include one or multiple conductors for providing signal communications and electrical power to the assembly. A "carrier" as described herein means any device, device component, combination of devices, media and/or member that may be used to convey, house, support or otherwise facilitate the use of another device, device component, combination of devices, media and/or member. Exemplary non-limiting carriers include coiled tubing, drill strings of the coiled tube type, of the jointed pipe type and any combination or portion thereof. Other carrier examples include wirelines, wireline sondes, slickline sondes, drop shots, downhole subs, bottom-hole assemblies, and drill strings.

Any number of downhole tools or components may be deployed in the borehole. For example, the tool string 16 includes a first logging tool 20, a second logging tool 22, a formation test tool 24, a sidewall coring tool 26, and a perforation tool 28. The first logging tool 20 includes a sensor 30 for performing a downhole measurement such as temperature or pressure. The second downhole tool 22 includes a sensing apparatus 32 that is configured to emit energy (e.g., acoustic, seismic, electromagnetic, neutron radiation, etc.) into the formation 14 and receive signals due to interaction with the formation 14. The formation test tool 24 is configured to extract a sample of formation fluid, and the coring tool 26 is configured to extract a formation sample and measure the formation pressure and/or measure a property of the sample. The perforation tool 28 is configured to perforate a casing during, e.g., hydraulic fracturing or other stimulation. These downhole tools are just examples. Other types of downhole tools are also contemplated. It is noted that the use of the term "tool" is intended to encompass any device or component that can be deployed downhole or subsea and communicate with a processor located at the surface, remotely from a wellsite or located downhole.

The system 10 includes a surface processing unit 34, which may include a surface panel, local host and/or client processors. The surface processing unit 34 may provide or facilitate power transmission to the downhole components, and also sends and receives data and communications to and from the downhole components.

The surface processing unit 34 forms a part of a communication network used to communicate between the surface processing unit 34 and one or more downhole tools or components, such as the tools included in the tool string 16. A downhole processing unit is located in the borehole, and includes at least one processor and suitable electronics to transmit signals and/or data between the tools and the surface processing unit 34, and/or transmit power to the tools. The downhole processing unit is referred to herein as a string host or subsurface host 36. In the example shown in FIG. 1, the string host 36 is connected in communication with each of the tools. The tools may be connected in series by suitable links (e.g., fiber optic cables, electrical conductors or both), or can be connected in parallel to form a branched network. The tool string or other carrier may also include structures designed to support and connect the tools and/or components in a selected network configuration. For example, electronic and structural features are included to connect the components according to topologies such as bus, star, ring, tree and mesh topologies or combinations thereof.

In one embodiment, one or more tools may communicate with at least one sensor or instrument associated with the tool. For example, a processor located within a tool may communicate instructions to or receive information from one of the sensors using a communication protocol, including but not limited to Serial Peripheral Interface (SPI) or Inter-Integrated Circuit (I2C) protocol. Instructions received from one of the hosts may instruct the tool processor to reconfigure a sensor element (requiring the tool processor to process the received command and issue a set of commands to the sensor element to perform the required task) or could include an embedded instruction that is simply passed-through to the sensor element.

Each tool communicates with the subsurface host using a predetermined communication protocol. Not all of the tools in the tool string 16 may be capable of using the same communication protocol, so the string host 36 communicates with each of the tools in the tool string using a communication protocol associated with the respective tool. Where needed, the string host may translate between a communication protocol associated with the tool and another protocol, such as the communication protocol used by a surface host such as the surface processing unit 34, another logging tool or component, legacy tools, and/or one or more third party vendors. The string host can thus be used to connect equipment from different service companies or vendors, or company division segments. Data mapping may also be performed during network node routing and translation of protocol. For example, data can be mapped for database recording, and/or mapped to application layers, display format and clients.

In one embodiment, the communication network is divided into one or more network subsets. Each network subset includes at least one network device that is configured to communicate with one or more downhole tools or components via a suitable link using a selected protocol. Each network device and tool (or sensors or instruments in a tool) can be considered a node. A source node is a node from which a communication originates, such as a surface host, downhole tool or sensor. A destination node is a node to which a communication is directed, which could be a downhole tool or sensor receiving data or instructions from a surface host, or could be the surface host receiving data from a tool or sensor. One or more subsets can be interconnected to form a surface-subsurface network structure for use in temporary, permanent or semipermanent deployments and installations.

Subsets may include one or more portions of the network, e.g., network circuits or network segments. In one embodiment, each subset is configured as a local area network (LAN) or includes multiple LANs. The subset LANs are joined to form a wide area network (WAN). The network may also be configured as a backbone network that includes a central conduit, such as a wireline or power conductor, that extends from surface nodes into the borehole networked nodes.

In one embodiment, each subset is configured as a sub-network, also referred to as a subnet, which are typically separated by routers and may include one or more network segments interconnected by, e.g., network switches.

In one embodiment, each subset is associated with a different protocol or combination of protocols. The subsets are separated by boundaries that occur when the protocol or protocol combination changes. Such changes can occur due to differences in protocol selections or component attributes, addressing, frame structure, physical layers, etc.

Links between network devices and/or downhole components can be formed in any suitable manner, and be disposed or configured temporarily, semi-permanently or permanently. Nodes and links may be built into a string equipment assembly electrically and mechanically connected to the surface through a subsurface host and a link such as a wireline. The network embodiments described herein can be used in various applications employed by subsurface assemblies such as drill strings, wirelines, coiled tubings, and subsea ocean bottom stations.

Temporary connectivity can be employed for, e.g., wirelines (cased or open-hole), wired tubing, wired pipe (drill pipe), drill string with mud telemetry media, ballistics perforation, completion, permanent and semi-permanent installations, sensors, and fracking (subsurface formation fracturing)

Permanent and semi-permanent connectivity can be employed for, e.g., permanent installations, production ports and valves (production controls), pumps, functional modules (e.g., health monitoring), reservoir Sensors, reservoir injection and stimulation services, production flow sensors (PLT), smart completions, and production injection and artificial lifting. In addition, concurrent permanent and semi-permanent network connections and operations can be employed.

Figure 2:
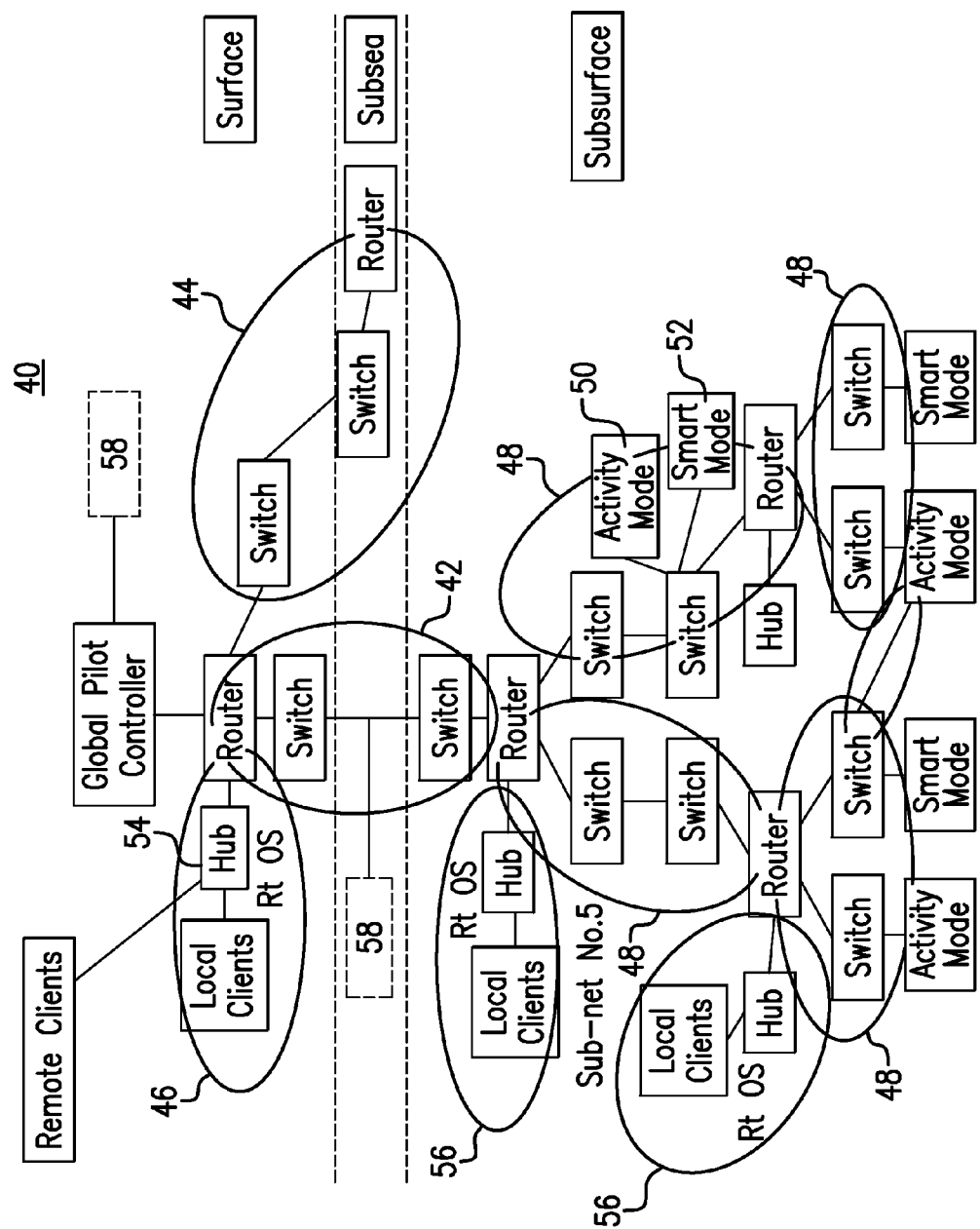
FIG. 2 depicts aspects of a communication network incorporated in a subsurface and/or downhole system.

FIG. 2 illustrates an exemplary network structure that can be utilized in various downhole applications, such as the wireline tool string shown in FIG. 1. A network 40 includes a subset 42 formed by a surface host (e.g., the surface processing unit 34) and a subsurface host (e.g., the string host 36). Other subsets that can be formed with the surface host include a subset 44 connecting the surface host with a subsea device, and a subset 46 formed that connects the surface host to local clients and/or remote devices. subsets formed at surface, subsea and/or subterranean locations (i.e., in one or more boreholes). At least one downhole subset 48 is formed by the subsurface host and one or more downhole tools.

Each subset is associated with a protocol or protocol construct. Network devices and/or tools in each subset are configured to communicate by a common protocol. In one embodiment, all of the tools in a subset communicate exclusively using the subset's common protocol. In some cases, some or all of the subsets have different common protocols. As described herein, a "protocol" or "protocol construct" may include a single communication protocol or a group or suite of protocols, e.g., a protocol stack that includes communication protocols for different network layers.

For example, a first subset 42 incorporates a surface processor such as the surface processing unit 34 and is connected to a downhole processor, such as the string host 36. The nodes in this subset 42 communicate by a first protocol, such as a Wireline Telemetry System (WTS) protocol. A second subset 48 is connected to the first subset by the string host 36, which communicates with downhole tools 50 and 52 using a second protocol, such as a powerline communication (PLC) protocol. A boundary is formed between each subset, which is defined as a location in the network that changes between protocols. For example, the string host forms a boundary between the subsets 42 and 48 by translating data sent from the surface from a first protocol (e.g., bi-directional surface 1553 Manchester encoding between the surface and string hosts) to a second protocol (e.g., AMI (edge triggered) encoding) used to communicate between the string host and a downhole tool. A router, gateway or other device is connected to or incorporated in each subset to allow for communication between each subset.

Data payloads are transmitted between subsets or along a chain of subsets, from a node of origin to a destination node. A node refers to a uniquely addressable point in the network, which may be a source or a destination of data or communications to support processes management (surface, subsea and downhole), activity tracking and control, system state identification and transition management required for the delivery of a client service. Nodes may be, for example, the surface host, local clients, remote clients, tools and/or sensors.

In addition to communication within the network 40, the network may include components to facilitate communication with external or remote networks or devices. For example, a hub 54 or other device connects the surface host to an external network such as an internet network, which is not connected continuously to the downhole subnets but is discontinued by another transport and network protocol. In another example, one or more subsets 56 located downhole include an Ethernet hub independent from the surface.

For example, a separate internet network could be setup in the sub-surface area. Such a network is separate from the surface host and may have a different address and routing scheme than the network 40. A surface to sub-surface gateway could be implemented with a table mapping surface to subsurface logical names and physical and routing information of sub-net nodes.

As shown in FIG. 2, communications and data can be transmitted to different subsets sequentially (in series) or in parallel. For example, in the system 10, individual tools or groups of tools are arranged sequentially along the borehole 12, with one or more tools defining a subset. Communication can be affected by transmitting data sequentially through each subset and/or by branching to allow for parallel transmission.

The configurations and locations of the network or network regions are not limited to the embodiments described herein. For example, multiple networks may be disposed at surface, subsea and/or downhole locations or regions and may be located or connected locally or remotely relative to the site of an energy industry operation. For example, FIG.

2 shows a network region 58 including multiple network subsets as described herein. Additional network regions 58 may be located or connected to subsea regions and/or surface regions.

Data and information can be routed between different network regions, such as by using downhole to downhole routing capability (e.g., by one or more routers downhole), surface to downhole routing (e.g., by one or more routers located at the surface and/or downhole), downhole to surface routing (e.g., by one or more routers located downhole and/or subsea), and/or downhole to subsea routing (e.g., by one or more routers located subsea).

For example, a processor such as a global pilot controller may be coupled to subsea and/or downhole networks, and also be coupled to a surface network region 58. The surface network 58 may include a surface pilot controller for regional control and/or optimization. The network may also include a subsea network region 58 having a subsea pilot controller. In addition, the downhole network region may include a downhole pilot controller.

Embodiments of networks and network subsets described herein are discussed herein in the context of the Open Systems Interconnection (OSI) model. Various protocols are also discussed in connection with the OSI model. For example, each subset is described herein as having a different protocol construct, which includes a selected protocol for one or more OSI model layers. Examples of such protocols that can be used downhole include powerline communication (IEEE 1901-2010 Standard), TCP/IP, UDP, OFDM, wavelets, and others. It is noted that these protocols and models are presented for purposes of discussion. Embodiments described herein are not limited to these protocols.

The OSI model is a conceptual model that characterizes and standardizes the internal functions of a communication system by partitioning it into abstraction. The ISO model groups similar communication functions into one of seven logical layers. A layer serves the layer above it and is served by the layer below it. For example, Layer 4, which provides error-free communications across a network, provides the path needed by applications above it. Layer 4 also calls the next lower layer (Layer 3) to send and receive packets. The seven layers that make up the OSI model are shown in FIG. 3. Exemplary protocols applicable to Layers 1-7 are listed below:

Layer 7—Application layer (Host script behavioral layer):
NNTP, SIP, SSI, DNS, FTP, Gopher, HTTP, NFS, NTP, SMPP, SMTP, SNMP, Telnet, DHCP, Netconf (OSI stack FTAM, X.400, CMIP; TCP/IP stack: http, ftp, SMTP, SNMP)

Layer 6—Presentation Layer (Host script behavioral layer):
MIME, XDR, Basic Encoding Rules of Abstract Syntax Notation One (ASN.1), converting an EBCDIC-coded text file to an ASCII-coded file Layer 5—Session Layer (Host script behavioral layer):
Named Pipe, NetBIOS, SAP, PPTP, RTP, SOCKS, SPDY Layer 4—Transport Layer:
TCP (Transmission Control Protocol), UDP (User Datagram Protocol), SCTP, DCCP, SPX, WTS, 3504;

Layer 3—Network Layer:
IP, IPv4, IPv6, ICMP, IPsec, IGMP, IPX, AppleTalk, X.25 PLP, Tool address;

Layer 2—Data link Layer:
PPP (Point-to-Point protocol), ATM, ARP, SDLC, HDLC, SLIP, GFP, PLIP, IEEE 802.2, LLC, L2TP, IEEE 802.3, Frame Relay, ITU-T G.hn DLL, X.25 LAPB, Q.921 LAPD, Q.922 LAPF, CAN, SPI, Tool Subsets (WTS/3504);

Layer 1—Physical Layer:
FDDI, ITU-T, G.hn, IEEE 802.11, Bluetooth, IEEE 802.15.4, TCP, UDP, SCTP, DCCP, Parallel SCSI, SPX, Manchester 1553, RS-485, RS-232, RS-449, OFDM, Wavelets, AMI, TTL and CMOS logic, RS-232, EIA/TIA-232, EIA/TIA-449, ITU-T V-Series, 1.430, 1.431, PDH, SONET/SDH, PON, OTN, DSL, IEEE 802.3, IEEE 802.11, IEEE 802.15, IEEE 802.16, IEEE 1394, ITU-T G.hn PHY, USB, Bluetooth.

For example, ARP is used to translate IPv4 addresses (OSI layer 3) into Ethernet MAC addresses (OSI layer 2—lower layer). As frames are routed through a network, data nested in lower model layers can contain functional specifications supporting a higher layer in another part of the network.

In an exemplary configuration of the network 40, each network subset 42, 44, 46, 48 is a network segment, which is defined as two or more devices that communicate with each other at OSI layer 2 using network connectivity devices with no routing at Layer 3 between them. Network segments may be physical or logical (virtual). Logical segments are referred to as virtual local area networks (VLANs).

For example, the subset 42 includes a surface host and a string host that communicate with one another using Layer 2 connectivity devices (e.g., switches) that move data packets at OSI layer 2 between the hosts. The subset 48 includes one or more processors that communicate with one or more downhole tools at Layer 2 using, e.g., switches. The subsets communicate with one another using OSI Layer 3 devices, such as routers or load balancers, which move data packets at layer 3 between network segments.

FIG. 4 shows an example of a protocol construct that includes a set of protocols for different network layers. This construct is referred to as the TCP/IP internet protocol suite. As shown in FIG. 4, the TCP suite defines four layers (Application, Transport, Internet and Link). The Application layer corresponds to Layers 5-7 of OSI, the Transport layer corresponds to Layer 4 of OSI, the Internet Layer corresponds to Layer 3, and the Link layer corresponds to Layers 1 and 2 of the OSI model.

Another example of a protocol construct is a powerline communication (PLC) standard such as the Broadband over Power Line Networks standard, specified by IEEE Standard 1901-2010. The IEEE Std 1901-2010 is a standard for high speed (up to 500 Mbit/s at the physical layer) communication devices via electric power lines, so-called broadband over power lines (BPL) devices. The standard uses transmission frequencies below 100 MHz. This standard is usable by all classes of BPL devices, including BPL devices used for the connection (<1500m to the premise) to internet access services as well as BPL devices used within buildings for local area networks, smart energy applications, transportation platforms (vehicle), and other data distribution applications (<100 m between devices).

The 1901 standards include two different physical layers (PHYs), one based on FFT orthogonal frequency-division multiplexing (OFDM) modulation and another based on wavelet OFDM modulation. Each PHY is optional, and implementers of the specification may, but are not required to include both. The Fast Fourier Transform (FFT) PHY includes a forward error correction (FEC) scheme based on convolutional turbo code (CTC). The second option "Wavelet PHY" includes a mandatory FEC based on concatenated Reed-Solomon (RS) and Convolutional Code, and an option to use Low-Density Parity-Check (LDPC) code.

On top of these two physical layers, two different media access control (MAC) layers are defined. To manage coexistence between PHY's and MAC's the Inter-System Protocol (ISP) was developed. ISP enables various BPL devices and systems to share communication resources (frequency/time) when installed in a network with common electrical wiring.

To facilitate transfer of data between the various subsets, various network devices may be included in the network architecture and operation. Examples of such devices include hub devices (OSI Layer 1—L1 Physical Events), switch devices (OSI Layer 2—L2 Data and Frames structure), router devices (OSI Layer 3—L3 Network), load balancing devices (nodes between sub-net clusters and Layer 3), Firewall devices (Network security boundaries at OSI Layer 3), and Virtual Private Network (VPN) devices A hub is a network device that links network components such as workstations and servers at OSI layer 1. The hub contains a port for each network device and copies data received on one port to every other port whether required or not. Hubs could be used in some cases such as networking between members of server clusters supporting the heartbeat mechanism of cluster nodes. (e.g. WTS Internal Bus)

A switch is a network device that moves network packets from one device to another at OSI layer 2. Switching devices can determine MAC addresses of packets' destination devices by monitoring network traffic. Once destination addresses are determined, switches can send specific packets to the port that connects to the network adapter with a specific MAC address. Enterprise-level switches could have the capability to route packets at OSI layer 3 between network segments, and thus could be used as routers.

A router is a network device that moves data packets from one network segment to another based on OSI layer 3 addresses. Routing devices are capable of exchanging information with other routers on the network to determine the most efficient path from one device to another.

A load balancer is a network device that facilitates horizontal clustering, where multiple servers are configured to perform the same function on the network. The load balancing functionality may be provided by software or a hardware device in one of two ways. Distributed functionality involves each node in the cluster receiving every packet destined for the cluster. Routed functionality involves the load balancer receiving every inbound packet destined for a cluster and deciding which host in the cluster to send the packet to.

A firewall is a network device that controls the flow of traffic between network segments using OSI layer 3 addresses in order to meet security requirements. Firewall services could be implemented by a dedicated hardware device (particularly to protect the boundary between the internal network and an external network such as the Internet), or by a network host running a software firewall.

Referring again to FIG. 2, multiple subsets in the network 40 are configured as subnets, each of which are associated with a specific identifier. For example, data transmitted to subsets 42 and 48 are routed using a subnet ID (e.g., a packet header prefix). In this example, each of the surface host and the string host includes a router that translates between protocols of adjacent subsets and define the boundaries of subset 42. In subset 42, the local host is linked to the string host by a wireline and communicates via a WTS protocol. The subsets 48 are connected in series or in parallel and are each bounded by at least one router and one or more downhole tools. In each subset 48, communication between the router and the downhole tool(s) is affected using a different protocol. For example, one of the subsets 48 includes a router connected to one or more tools via an AC power conductor, which communicates via a PLC protocol. Another subset 48 includes, for example, a router connected to one or more tools via a WTS instrument bus.

Figure 5:
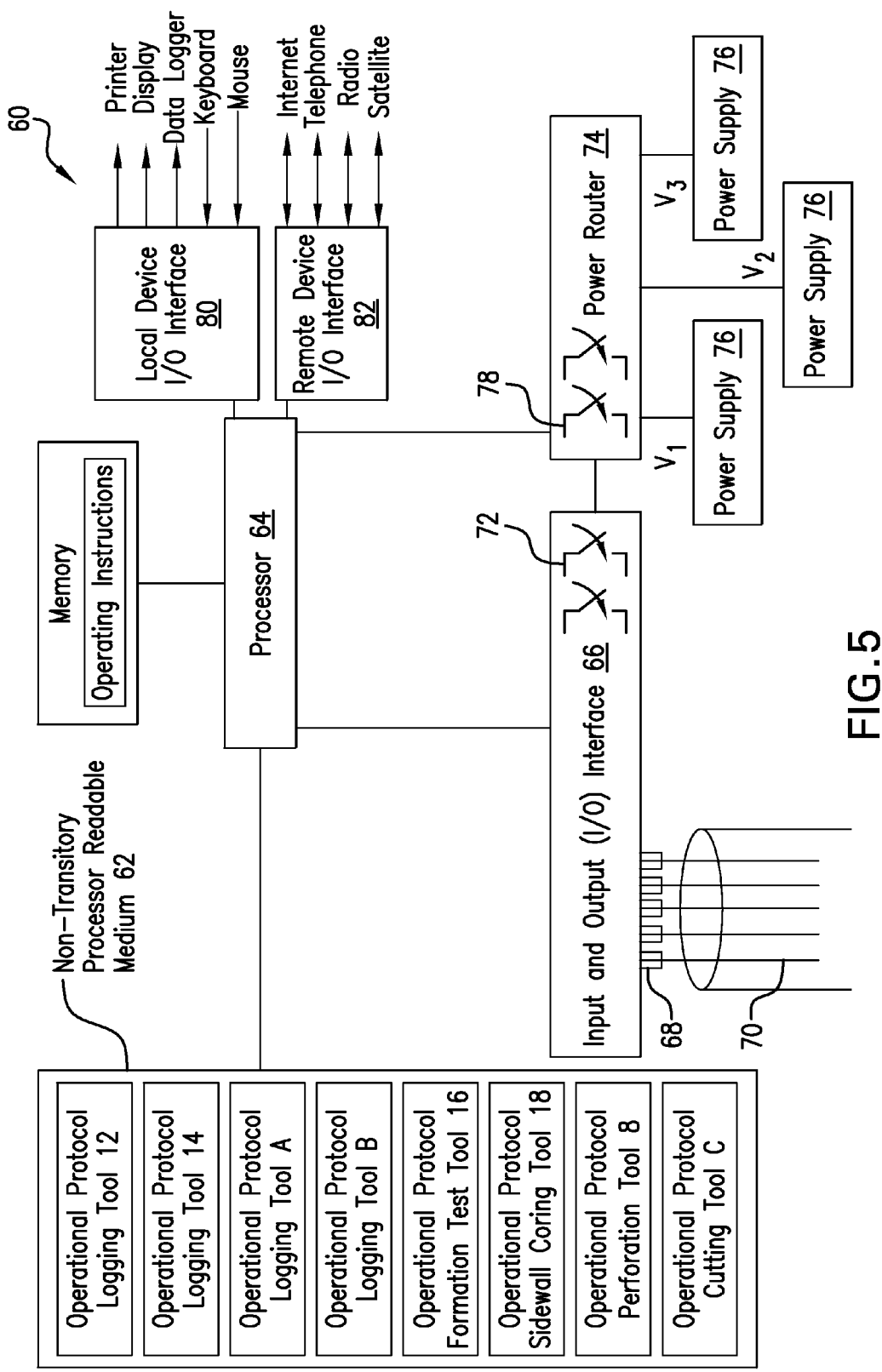
FIG. 5 depicts aspects of a processing device or system incorporated as part of a subset of a communication network.

FIG. 5 illustrates an embodiment of a downhole, subsea or subsurface processing device 60 that may employed as part of one or more network subsets. The device 60 is incorporated in, for example, a surface host, string host, router, gateway or downhole tool. The device 60 includes a non-transitory processor readable medium 62 such as a hard drive or solid state semiconductor memory. The medium stores physical and/or operational protocols or protocol constructs (layer stacks) for one or more downhole components or tools. For example, the device stores protocols for one or more of the tools of system 10.

A processor 64 is coupled to the medium 62 and is configured to download each operational protocol associated with a deployed tool in its respective subset. The processor 64 is further configured to execute the instructions of each operational protocol to operate each deployed tool and rout appropriate electrical power and/or communications to each deployed tool in the subset as specified in the associated protocol. The device 60 and/or the processor 64 is further configured to perform network functions such as collecting in-network a list of branches, nodes and tools connected below the current node on the network tree below the current node, collecting network structure, protocols and current node position, monitoring network operational health, and reporting to the surface.

The device 60 is connected to another processor or router, and/or is connected to the surface via wireline or other suitable telemetry system. The device 60 includes one or more input/output (I/O) interfaces 66, which include connectors 68 for connecting to one or more conductors 70 that transmit and receive signals to and from the deployed downhole tools and/or supply electrical power to the deployed downhole tools. The I/O interface 66 is also coupled to the processor 64 in order for the processor 64 to send and receive signals to and from the deployed tools in accordance with the operational protocol of each deployed tool attached to a network node. The I/O interface 66 may include various signal conditioning devices (not shown) such as filters, amplifiers, and attenuators to provide appropriate signals for transmitting and receiving by the processor 64. In addition, the I/O interface 66 may include digital-to-analog converters (not shown) and analog-to digital converters (not shown) for interfacing with analog signals of deployed tools or surface signals. Signals and power may be routed in the I/O interface 66 using a plurality of switches 72, which can be relays or solid state semiconductor switches as non-limiting embodiments.

In one embodiment, the device 60 is connected to a plurality of conductors 70, each of which is connected to one or more downhole tools. Each conductor 70 is configured to transmit signals from the processor 64 using a different protocol or protocol stack/construct. In one embodiment, the processor 64 is configured to have routing capabilities (e.g., having the functionality of a network router), and each conductor 70 forms a link in a network subset that is responsible for transmitting communications in the subset's respective protocol.

In one embodiment, the system includes a power router 74 configured to route electrical power from one or more power supplies 76 to each of the deployed tools. In one or more embodiments, one power supply 76 may be configured to supply each of the specified power types (e.g., DC or AC and voltage and current rating) required by the plurality of downhole tools. In one or more embodiments, separate power supplies 76 may be used where each power supply 76 supplies one or more types of specified power. In order to route the electrical power to the appropriate deployed tool, the power router 74 includes one or more switches 78, which can be relays or solid state semiconductor switches as non-limiting embodiments. The switches 78 can be configured to route power to appropriate connectors specified in the power protocol through the I/O interface 66 or to other conductors.

The device 60 may include a local I/O interface 80 configured to provide connections to local input and output devices such as a keyboard, a mouse, a display, a printer, and a data logger. The device 60 may also include a remote I/O interface 82 configured to communicate with remote input and output devices using the Internet or some other communication medium and protocol.

Figure 6:
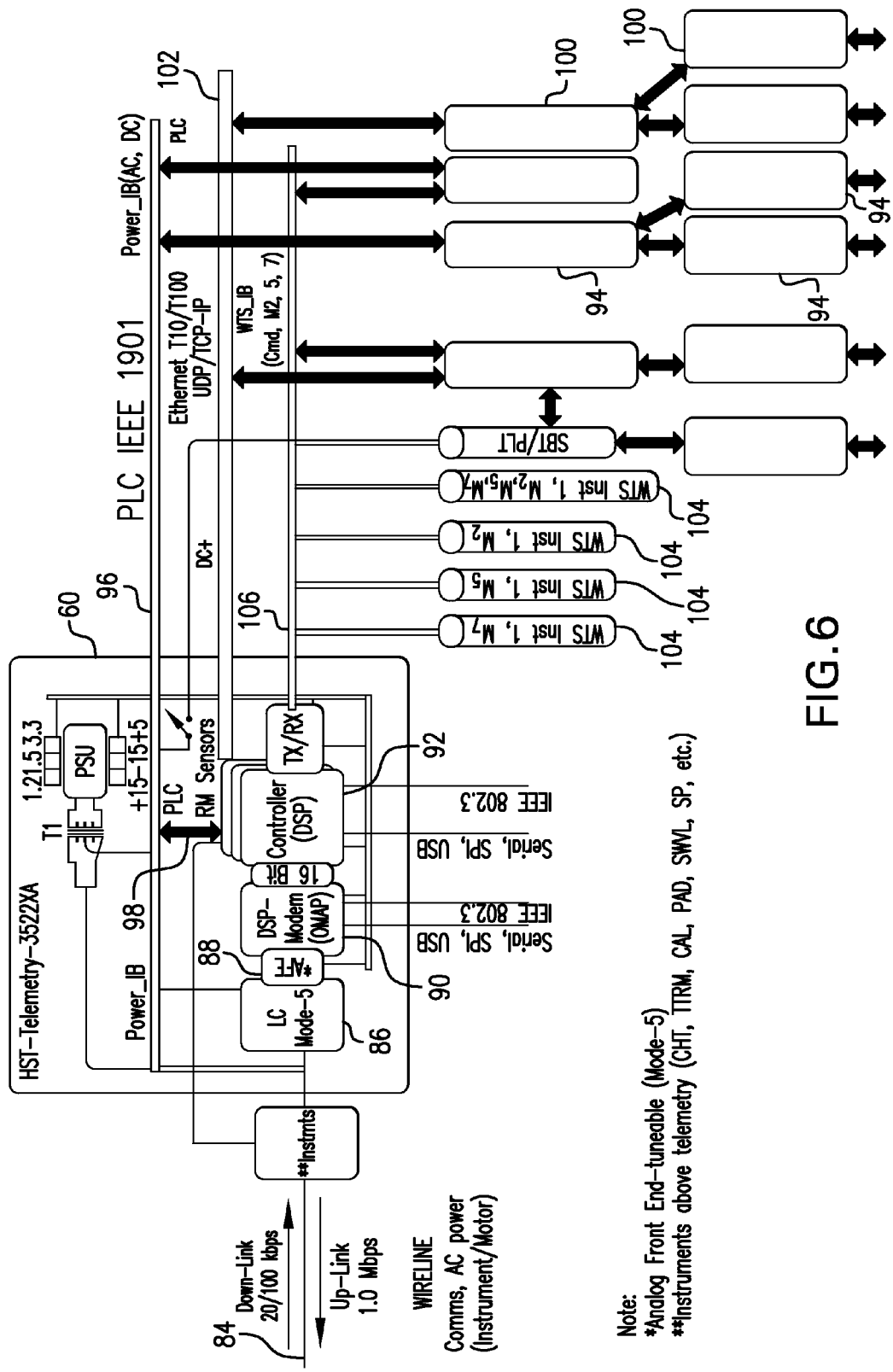
FIG. 6 depicts aspects of a physical implementation of one or more network subsets.

An exemplary implementation of one or more subsets is shown in FIG. 6. In this implementation, the processing device 60 is configured as a string host, which serves as a translation node or common remote that communicates with one or more surface hosts or processors located at or near the wellhead, or one or more surface remote hosts (optionally involving firewalls). A surface link 84, such as a wireline cable including one or more fiber optic and/or electrical conductors, transmits communication and/or power to the device 60 and various downhole tools. Communication signals are received through a connector 86, an interface 88 (e.g., analog front end circuitry), and an analog to digital conversion device such as a modem 90. The processor in this example is a controller 92, such as a microcontroller, DSP controller, or other processor, that receives the digital data and communicates with the downhole tools.

In this example, the controller 92 is connected to multiple groups of tools, each group having a different protocol stack. A first set of tools 94 is connected to a power conductor 96 and exchange data and signals over the power conductor 94 from the controller 92 using a PLC protocol stack. The controller 94 is connected to the power conductor 96 via a powerline switcher 98, by which the controller 94 can route data and signals to one or more of the tools 94. Another set of tools 100 is connected to the controller 92 over an Ethernet link 102 (e.g., an Ethernet cable) and communicate using another protocol stack (e.g., T10/T100 or UDP/TCP-IP). This set of tools 100 are individually coupled to the Ethernet link by suitable links that include switching devices such as network switches. A third set of tools 104 is connected to a wireline conductor 106, such as a WTS instrument bus. Each tool 106 is connected to the wireline conductor 106 via a switch controlled by the controller 92 to route data and signals to a selected tool 104. The device 60 forms part of a different subset for each group if tools, e.g., the device 60 and the first set of tools 94 form a subset, and the device 60 and the set of tools 100 form a separate subset.

One or more tools may be configured as a destination node and have its own processor and translation capabilities. Exemplary nodes include smart nodes and activity nodes. Such nodes can be simultaneously connected to switchers in different subsets, and translate between different protocols, simultaneously. For example, a tool 108 is connected to both the Ethernet link 102 and the WTS instrument bus 106, and includes a switch to allow the tool to receive data and signals in different protocols.

As shown in FIG. 6, subsets can be located in close proximity, particularly when configured as parallel subsets. For such configurations, quality of service (QoS) mechanisms may be incorporated with the protocol stack associated with one or more subsets, to avoid interference.

Figure 7:
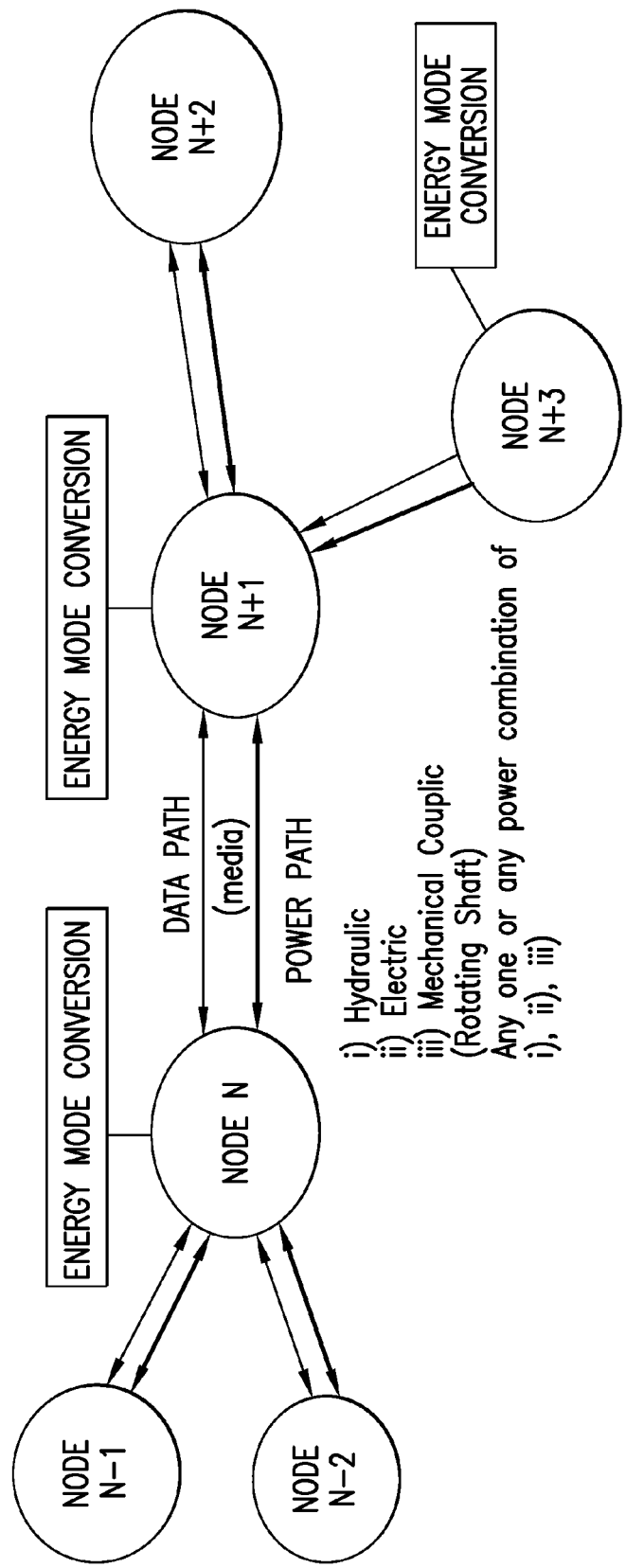
FIG. 7 depicts aspects of a network structure including data and power paths.

As discussed above, nodes or devices in the network may the capability to transmit both data and power, over a single link (e.g., powerline communications) or using multiple links. For example, as shown in FIG. 7, bus connection between any two network nodes could have a paired data connectivity path and energy transmission path. The power transmission could be at least one of multiple energy modes. Such modes include, for example, hydraulic, electric and mechanical coupling (e.g. rotating shaft, gear coupling, etc.). One or more of the network nodes may include internal energy conversion devices or features to allow the node to translate between energy modes.

In some instances, data intended for a tool or node in a subset located along a borehole string or other carrier may need to be routed through one or more subsets located further up the string or through one or more subsets located in the communication path between the string host and the tool. In one embodiment, data intended for tools or nodes (destination nodes) located further from a source node (e.g., the surface host and/or master service host) along a communication path is embedded or nested within data intended for destination nodes located closer to the source node. For example, data structures such as packets or datagrams intended for a tool farther down the tool string may be encapsulated, embedded or nested in packets or datagrams intended for tools up-string. In this embodiment, a first subset located closest to the source node along the communication path is configured to remove the outermost data intended for the first subset, and transmit the remaining data to a second subset located further from the source node. This process continues for each subset on the communication path for which data is intended, with each subsequent subset in the communication path removing data (if there is any for that particular subset), until the last subset is reached. A processor or processors in each subset translates the data (if needed) to the protocol stack associated therewith.

In one embodiment, if the surface host needs to send instructions or other data to multiple tools located in multiple subsets, a message is generated that includes nested packets or datagrams. For example, a first packet or datagram (e.g., OSI level 3 packet) is generated for a data set (e.g., all or a segment of an instruction) intended for one or more tools located in the furthest subset. A second packet or datagram is generated for another data set intended for a tool on a closer subset (e.g., in a network depth level). The first packet is nested or embedded within the second packet, so that the second packet data can be removed or stripped from the message without affecting the structure of the first packet. For example, the first packet is configured as part of the payload of the second packet. If there is a still closer subset (e.g., closer network depth level), the second packet (which has the first packet nested within) is nested within a third packet intended for the still closer subset. This nesting may be performed for any number of data sets, so that each subset can remove its respective packet, extract the relevant data and pass along the packet nested therein.

Upon receipt of a message that includes a nested packet, the upmost or closest subset or tool removes the outermost packet or datagram and passes the remaining packets or datagrams down string or further along a communication path. The next subset in the string would remove the now outermost datagram (if there is data present for that subset) and pass the remaining datagrams down string. Conceptually, this is similar to passing a nesting doll from one person to the next with each person taking the outermost doll and passing the remaining dolls to the next person. The process continues until all datagrams have been removed or the message gets to the end of the tool string or communication path.

Although the nesting embodiments are described in conjunction with transmission from a host away from the surface, the embodiments can be performed in other directions. For example, data or communication from a tool or processor in a downhole subset can be nested or embedded in a data packet if for example, the tool or processor sends data to multiple components.

Figure 8:
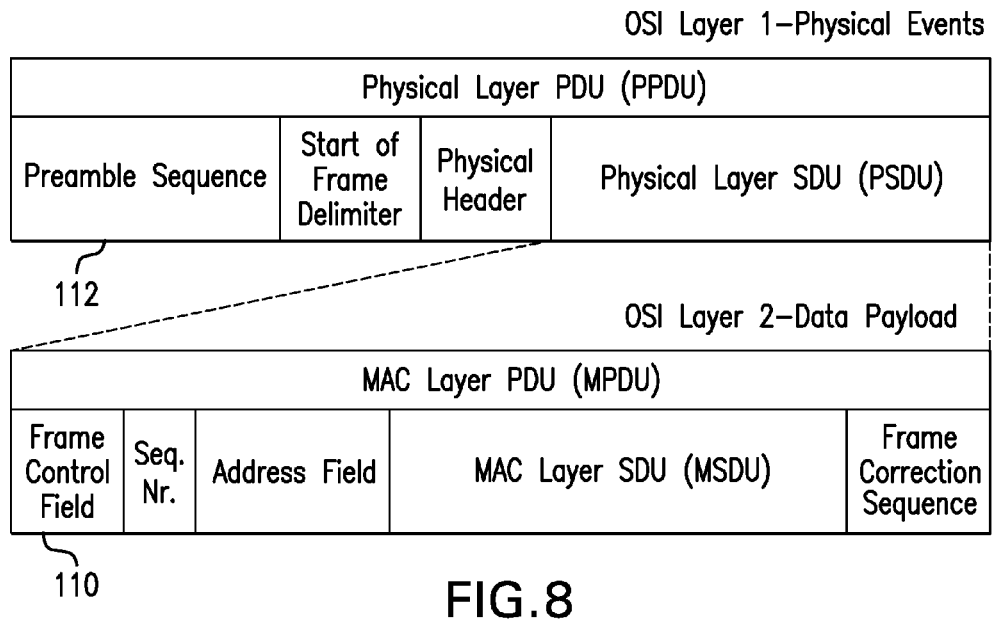
FIG. 8 depicts exemplary data structures used for communication between network devices and/or downhole tools.

An exemplary nesting configuration is shown in FIGS. 7 and 8, demonstrating one way in which data for one subset can be nested or imbedded within data for another subset. In this example, a data structure such as an OSI Layer 3 packet for a further subset is nested as part of the data payload of on OSI Layer 3 packet for a closer subset.

In one embodiment, the data structure for a closer subset (i.e., closer to the surface host or source node along the communication path) is nested as a service data unit (SDU) within a protocol data unit (PDU) generated for data intended for a further subset. PDUs are data structures utilized by peer entities that operate at the same network layer. For example, Layer 2 switches within a subset are considered peers, and communicate by transmitting a Layer 2 frame 110 by means of a certain protocol. The Layer 2 frame in this example is a PDU.

A service data unit (SDU) is a specific unit of data that has been passed down from an OSI layer to a lower layer, and which the lower layer has not yet encapsulated into a protocol data unit (PDU). An SDU is a set of data that is sent by a user of the services of a given layer, and is transmitted semantically unchanged to a peer service user. For example, as shown in FIG. 8, the frame 110 becomes a SDU when it is embedded as a data payload in a lower layer structure, i.e., a Layer 1 structure 112.

For example, a PDU of a layer N+1 (e.g., Layer 3) becomes a SDU at a layer N (e.g., Layer 2) when a data structure is passed from N+1 to N. In effect, the SDU is the 'payload' of a given PDU. That is, the process of changing an SDU to a PDU includes an encapsulation process, performed by the lower layer. All the data contained in the SDU becomes encapsulated within the PDU. The layer N−1 adds headers or footers, or both, to the SDU, transforming it into a PDU of layer N−1. The added headers or footers are part of the process used to make it possible to get data from a source to a destination.

It is noted that multiple SDUs can be imbedded within a payload of a PDU. For example, a host may generate a Layer 2 frame that includes multiple Layer 3 packets, one for each subset. The packets are embedded as part of the frame's data payload such that they can be successively removed by each successive subset that is intended to receive data.

Figure 9:
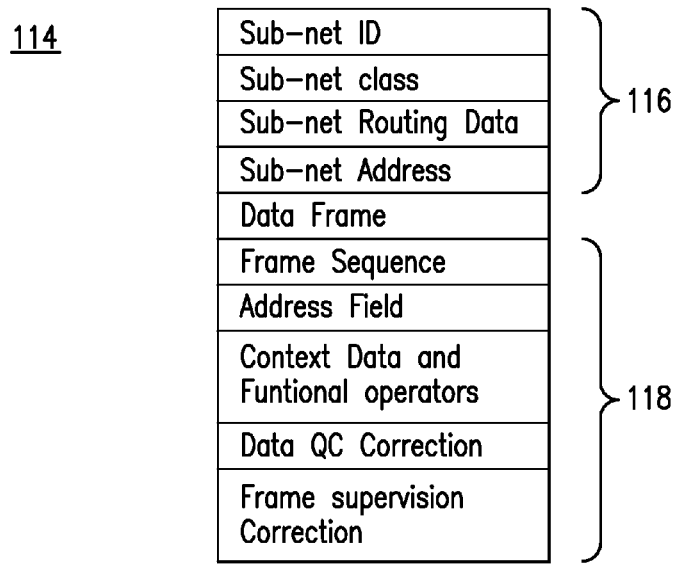
FIG. 9 depicts an exemplary data structure configured to encapsulate data intended for a network subset.

An exemplary frame 114 that can be used to nest data for multiple subsets in shown in FIG. 9. In this example, each subset is configured as a sub-net having a boundary formed by a router or other Layer 3 device. The frame 114 includes various Layer 2 information 116 (e.g., frame control, addressing and error checking), and also includes subnet information 118 that identifies and addresses the subnet for which data is intended. This frame can be imbedded as a payload in another frame (e.g., frame 110) intended for a closer subnet.

Figure 10:
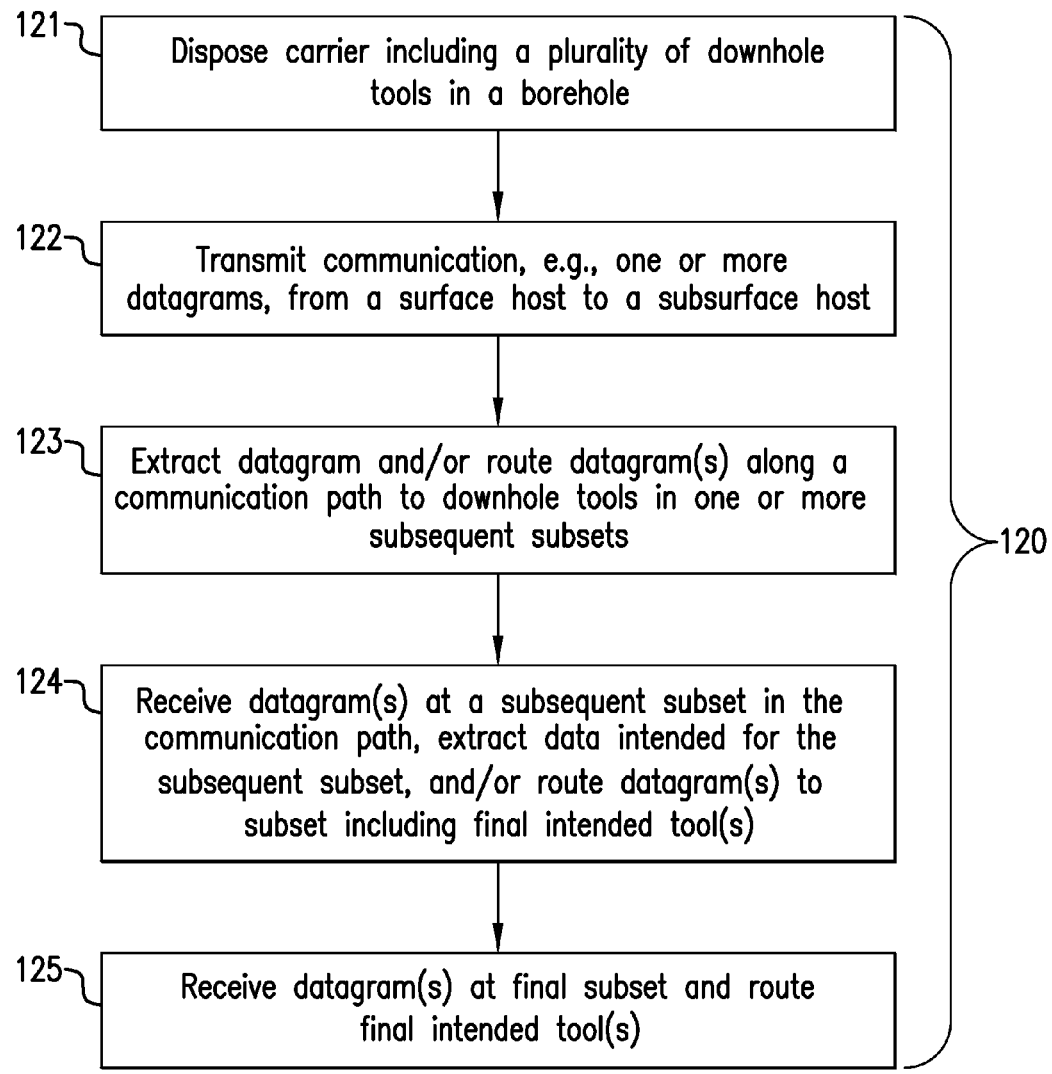
FIG. 10 is a flow chart depicting a method of communicating between a host and one or more subsurface components.

FIG. 10 illustrates a method 120 of communicating between a host and one or more subsurface components, and/or between subsurface components. A subsurface component may be located below the surface of a body of water and/or in a borehole. The method 120 may be performed in conjunction with the system 10 and/or the processing device 60, but is not limited thereto. The method 120 includes one or more stages 121-125. In one embodiment, the method 120 includes the execution of all of the stages 121-125 in the order described. However, certain stages may be omitted, stages may be added, or the order of the stages changed.

In the first stage 121, a carrier such as a borehole string is disposed in a borehole. The borehole string includes a plurality of downhole tools and a string host in communication with a surface host.

In the second stage 122, a surface host such as the surface processing unit receives instructions to communicate with one or more downhole tools (which may be referred to as intended nodes, target nodes or destination nodes). The surface host generates a message that includes the communication data and transmits the message to a subsurface host using a first protocol. For example, the surface host sends a message to the subsurface host over a wireline using a WTS protocol.

In one embodiment, the host generates an OSI frame that includes the data as a payload, and also includes headers and trailers specifying the address of the target node (e.g., an OSI layer 3 address such as an IP address) and the address of the downhole host (e.g., an OSI layer 2 address such as a MAC address).

If the surface host is instructed (e.g., by a user or other processor) to send data to multiple tools, in one embodiment, the surface host generates a message that includes data structures (e.g., packets or datagrams) intended for tools in subsets located further from the host, which are nested or encapsulated in data structures (e.g., packets or datagrams) intended for tools in subsets closer to the host. For example, the host generates a Layer 2 frame that includes a nested Layer 3 packets or datagram for each tool.

A data structure for one subset (e.g., subnet or network depth level) could be a routing payload for another subset having a different protocol, e.g., a different OSI model protocol layer stack construct. Communication can thus be accomplished using surface wrapped nested data structures (e.g., subnet frames) that include data along with address and routing details.

In the third stage 123, the subsurface host receives the message in the first protocol, extracts data intended for one or more tools connected to the downhole host, and translates the data to a second protocol if necessary. If the protocol used for communication with the connected tools is the same as the first protocol, translation is not necessary. If the message is intended for tools in one or more subsets below the downhole host subset (e.g., in a lower network depth level), the downhole host routes the message to a subsequent subset.

For example, the subsurface host receives a Layer 2 frame and unwraps the Layer 2 information from the frame to extract the payload, which includes the data and destination address. If the packet is intended for a tool in the downhole host subset, the host translates the data to the appropriate protocol and transmits the data to the tool. If the packet is not intended for the current subset, or if one or more additional packets are intended for subsets further down the network, the subsurface host wraps the additional packet or packets with Layer 2 information and transmits the additional packet or packets to the next subset.

In one embodiment, if data is being sent to multiple tools or subsets, the frame payload includes one or more packets nested therein. For example, that data payload of the frame includes one or more packets or other structures nested therein. An exemplary nested payload is shown in FIG. 8 and discussed above.

In the fourth stage 124, if data is intended for tools in subsets further from the downhole host, the downhole host wraps and routes the frame to the next subset. The processor in the next subset, e.g., a network router, unwraps the frame and extracts data intended for that subset. This routing and wrapping/unwrap is performed at each subset as the frame navigates through separate network subset channels and branches. For each subset, the frame is wrapped with different protocols and can be routed to separate directions and network branches.

In the fifth stage 125, a final subset receives the message, where a processor (e.g., a router) translates the data and sends the data to the final intended tool(s). The data is transmitted to the tool, or if the tool itself includes a processor or router, the tool transmits the data to components such as sensors or instruments associated with the tool.

Figure 11:
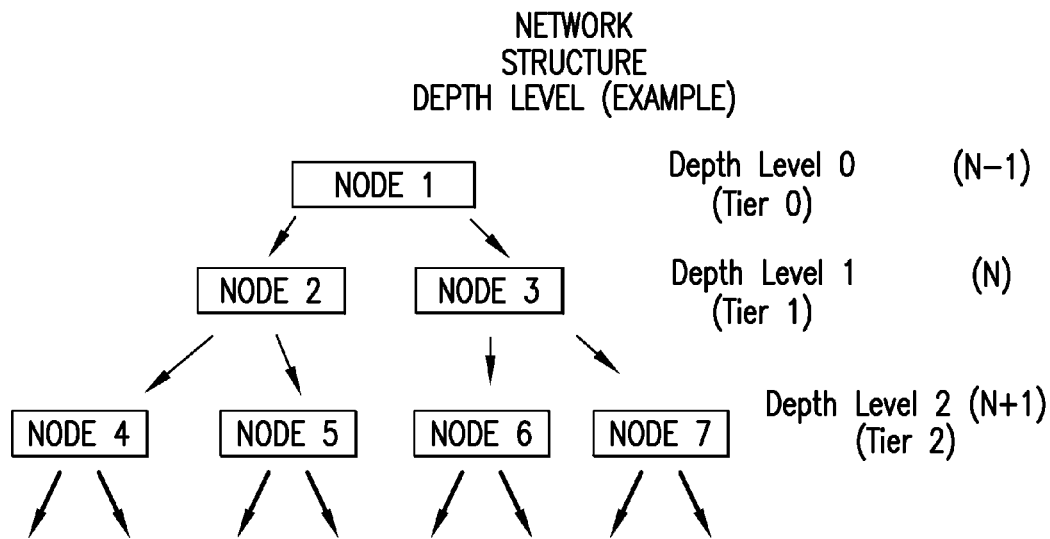
FIG. 11 depicts an exemplary network structure including depth levels.

FIG. 11 illustrates an example of a network organization or structure, in which network nodes (e.g., surface host, subsurface host, local clients, remote clients, subsurface tools or components, etc.). In this structure, the nodes are organized by their depth. As described herein, depth may be vertical depth, or may refer to a distance along the length of the borehole from the surface (e.g., for deviated or horizontal boreholes). A master node may be designated, and depth relative to the master node (network depth level N) is defined. An execution control and response hierarchy may also be defined.

In the example of FIG. 11, the nodes are designated NODE 1 through NODE 7, each of which has a network depth level. NODE 1 is located at depth level zero, NODE 2 and NODE 3 are located at depth level one, and NODE 4 through NODE 7 are located at depth level two. In this example, references to "closer" or "further" are in reference to relative depth levels.

Figure 12:
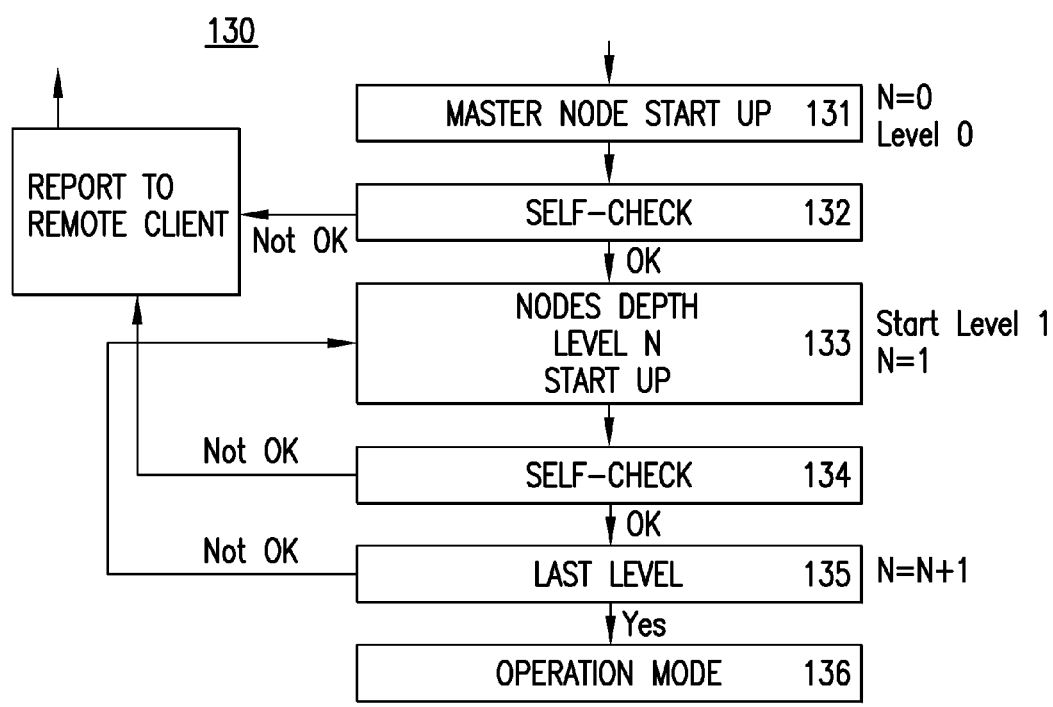
FIG. 12 depicts an exemplary network startup process.

FIG. 12 illustrates an exemplary startup process 130 for a network. This process is performed to accomplish various initial functions necessary for operation of the network. The process may include functions such as node discovery, node configuration setting procedures (from reset, protocol, logical and physical ports, database, curve names and attributes, OSI protocol stack, etc.), network node search and discovery, network configuration verification and testing.

The process 130 is performed by a device (e.g., a surface or subsurface host) designated as a master node. In the example of FIG. 11, NODE 1 is the master node. The master node starts up (block 131) and performs a self-check (block 132). If the self-check is successful, the master node prompts nodes (e.g., NODES 2 and 3) at the next depth level, and the nodes start up (block 133) and perform self-checks (block 134). Once this is successful, the nodes at the next depth level perform startup and self-check. This process continues until the last depth level is reached (block 135). If the self-check performed by any node is not successful, the node may report to a remote client to notify a user, or to a node in a previous depth level. After the process is complete, the network converts to operation mode (block 136).

Although the master node is described as a surface or subsurface host, it is not so limited, as any desired node can be designated as a master. In addition, multiple masters can be designated for different portions of the network. For example, regions of the network involving a number of nodes could be handed control of a network region master to better handle and manage effective real time response requirements for the operational service being delivered. This master assignment and distribution could vary from service to service, from application scenario to application scenario, or vary during the delivery of a particular service delivery (combination of an interdependent multitude of operational sequences)

Figure 13:
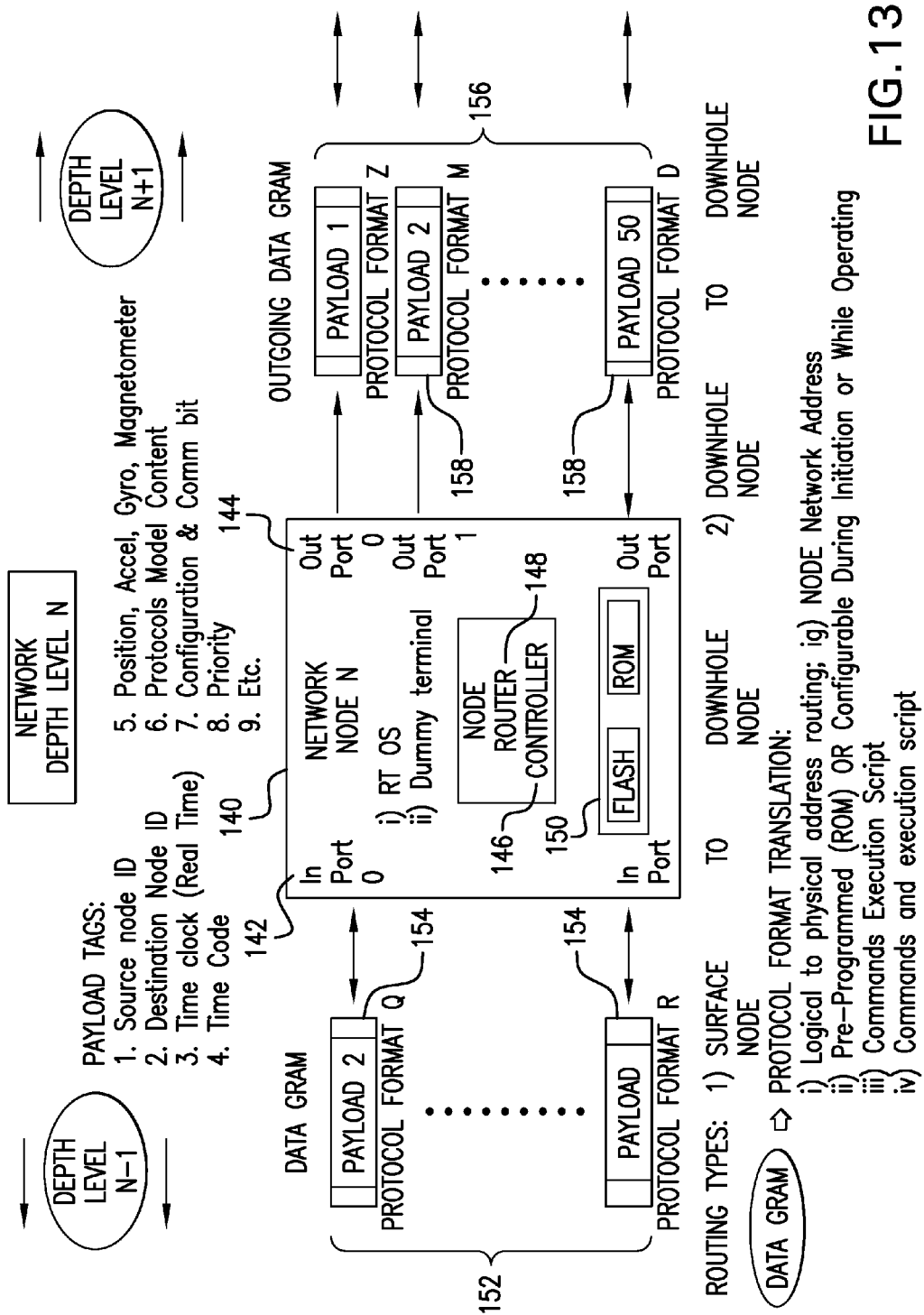
FIG. 13 depicts an exemplary network node.

FIG. 13 shows an embodiment of a network node 140 and exemplary operational functionality of the node 140 in communicating and routing data in a network (e.g., the network 40). The node 140 may be configured as any suitable type of device or component, such as a surface or subsurface host, client or subterranean tool or component. For example the node may include one or more features described above relative to the system 10 and/or the processing device 60. The network node is described in relation to the exemplary network structure of FIG. 10, but is not so limited. The communication and routing functions can be employed using a network node in any suitable network.

In one example, the node 140 is located within a specific subset and/or depth level N, e.g., one of the depth levels shown in FIG. 10. The network includes communication paths that include the node 140 at depth level N and adjacent nodes at depth level N−1 and N+1. Data is successively transmitted along the path in either direction (e.g., away from a master node or surface, or toward the master node or surface). The node can be configured to route surface node to downhole and/or downhole node to downhole node (execution sequential or real time coordination interlocks).

The node 140 includes a number (n) of input ports 142 and output ports 144 that connect, receive and deliver datagrams (or other nested data structures) to and from different network depth levels. Payloads in datagrams can be extracted at the node 140, reformatted from one datagram to another in a protocol translation operation under different protocols.

The Network node could include an operating system such as a Real Time Operating System (Rt OS), or function as a dummy terminal (having fewer capabilities than a full OS) in a simpler implementation. The node 140 includes various components such as a processor or controller 146, a router 148, and memory 150, such as volatile memory (e.g., RAM) and/or non-volatile memory (e.g., ROM or re-programmable memory (FLASH, FPGA elements)). The network node controller 146 can execute multi-threaded execution programs with simultaneous operations (service, monitoring and commanding service delivery) at the network node level N, executing steps and reaching performance objectives at the local network node under control of feedback (closed or open loop) when appropriate. For example, execution algorithms such as proportional-integral-derivative (PID) control loops can be typically utilized by nodes to control associated tools or components, such as pumps, elevators, motors, etc. The node controller may utilize whatever operational script sequences or physical action control algorithms that are needed locally at the network node level.

The node 140 is configured to receive one or more incoming datagrams 152, each of which include one or more nested payloads 154. Each payload is designated for a specific node or device, and includes data in a protocol format associated with the intended node. The payload may also include or be attached to information regarding the subset in which the intended node resides and the intended nodes corresponding protocol format. For example, each payload 154 includes a source node ID, a destination node ID, a time clock (relative and real time-calendar), a time code (elapsed time), and data type (e.g., position, accelerometer, gyro, magnetometer data, etc.). The datagram facilitates functions including, e.g., protocol format translation, logical to physical address routing, commands execution scripts, time synchronization operational synchronization, and others. The datagrams may be pre-programmed and discoverable (ROM), or configurable during start-up or while operation.

In operation, the node 140 receives and unwraps the incoming datagram 152 and determines whether the outermost payload(s) 154 are intended for the node 40 (e.g., based on the destination node ID). If so, the node 140 removes the payloads intended for it, and re-wraps the remaining payload(s) 154 in an outgoing datagram 156 that includes one or more outgoing payloads 158. The node 140 directs the outgoing datagram 156 to a node at depth level N+1. If no payloads are intended for the node 140, it simply re-wraps all of the payloads 154 and directs the outgoing datagram to the node at depth level N+1).

Figure 14:
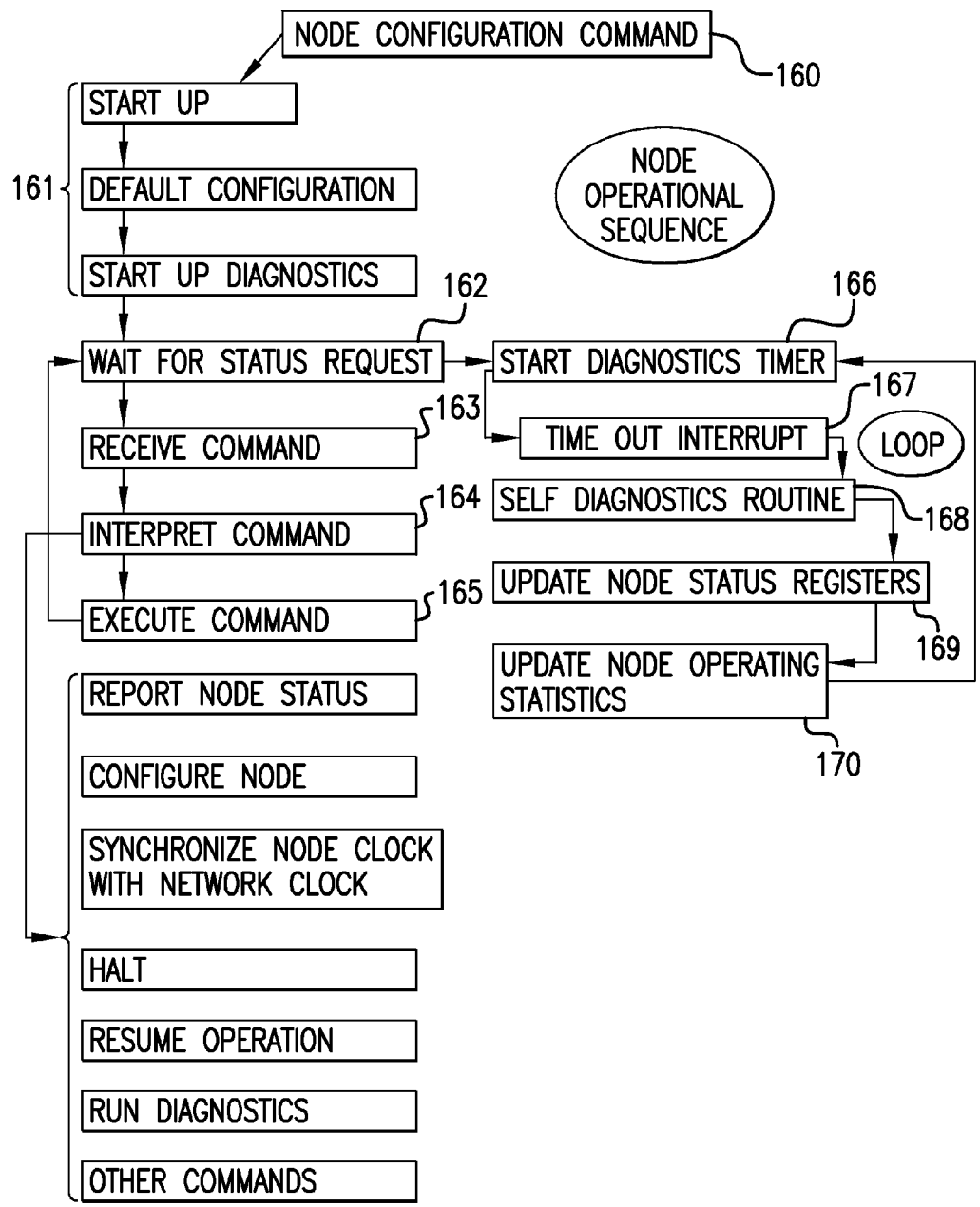
FIG. 14 depicts an exemplary operation sequence for a network node.

FIG. 14 illustrates an exemplary operation sequence for the node 140. This sequence can be applied to any network node in any suitable type of network. The node operational sequence includes a command-response execution loop and a diagnostics loop. The execution loop could be a pre-established or downloaded operational execution sequence and this operational sequence could be adjusted with performance parameter, execution set points, start or stop criteria from a network or network region master.

In this sequence, the node 140 receives a configuration command 160. The command 160 may include various command components, such as input/output ports logical to physical address mapping, a network active node list with address and routing details, port configurations and protocol stack definitions (e.g., network model layers), node command parameters, port to port network data variables, data units, formation data and curve names, datagram payload mapping, node clock synchronization with real time clock or network clock, datagram payload data format, network structure and protocol self-discovery parameters post-receipt, node script and algorithm, and/or state diagram execution state IDs.

The sequence includes start up functions (block 161) including setting a default configuration and diagnostics. After startup, the node 140 waits for a status request or other command from a master node or other node (block 162). Upon receiving a command (block 163), the node 140 interprets the command (block 164). This interpretation includes determining the type of command, examples of which include report node status, report operation state (operational state diagram), configure node, synchronize node clock with network clock, halt, resume operation, run diagnostics and others. After interpretation, the node 140 proceeds to execute the command (block 165) if the command is valid. The node 140 then waits for the next command. The command-response loop is formed by blocks 162-165.

The node 140 may also perform a diagnostic sequence loop that includes starting a diagnostic timer (block 166) and uses a time-out interrupt (block 167) to call a self-diagnostic routine (block 168). As a result of this routine, the node 140 then updates applicable status registers (block 169) and updates node operating statistics (block 170) where necessary.

Figure 15A:
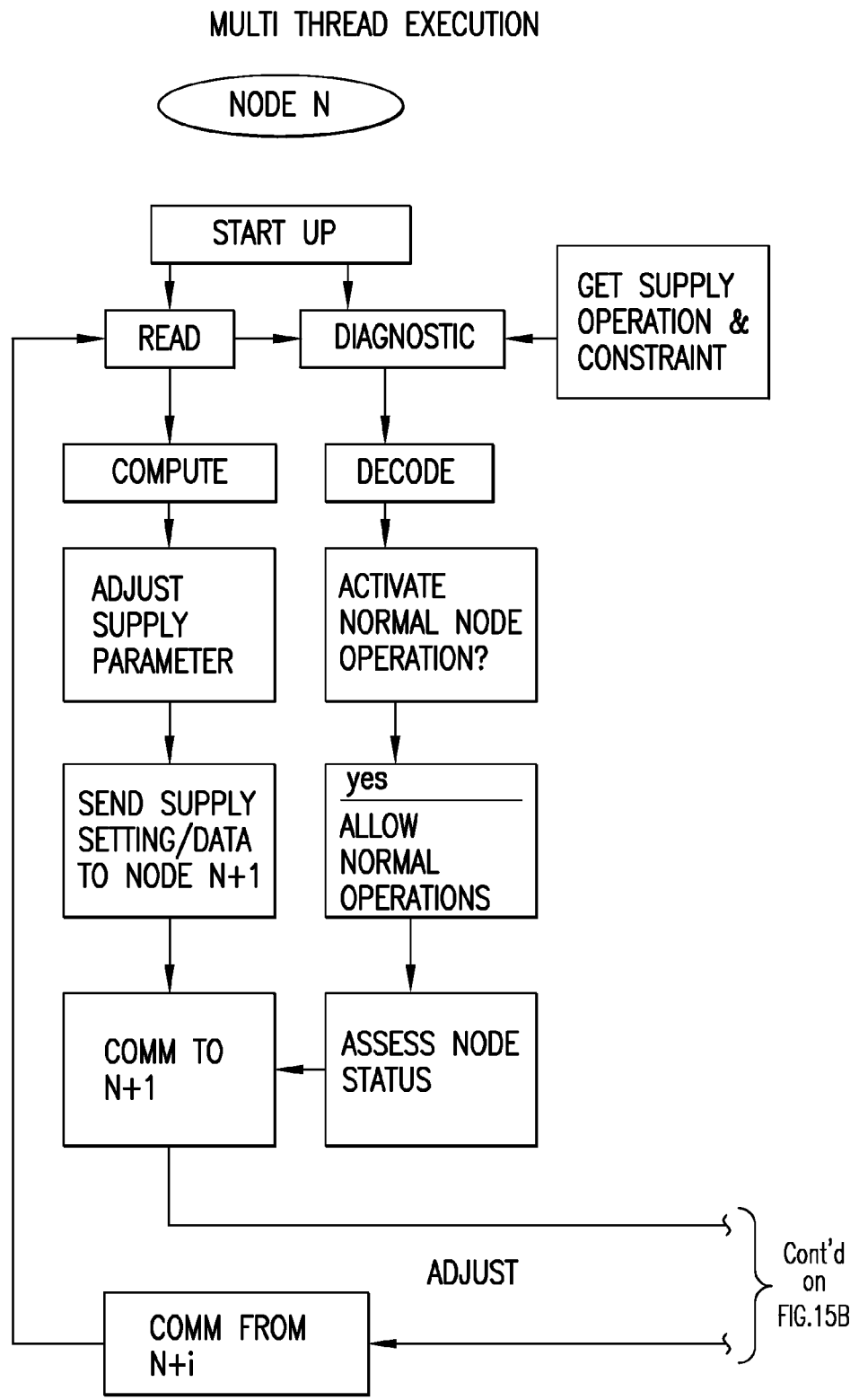
FIG. 15A depicts a first portion of an embodiment of a multithread execution performed by multiple nodes in a network.
Figure 15B:
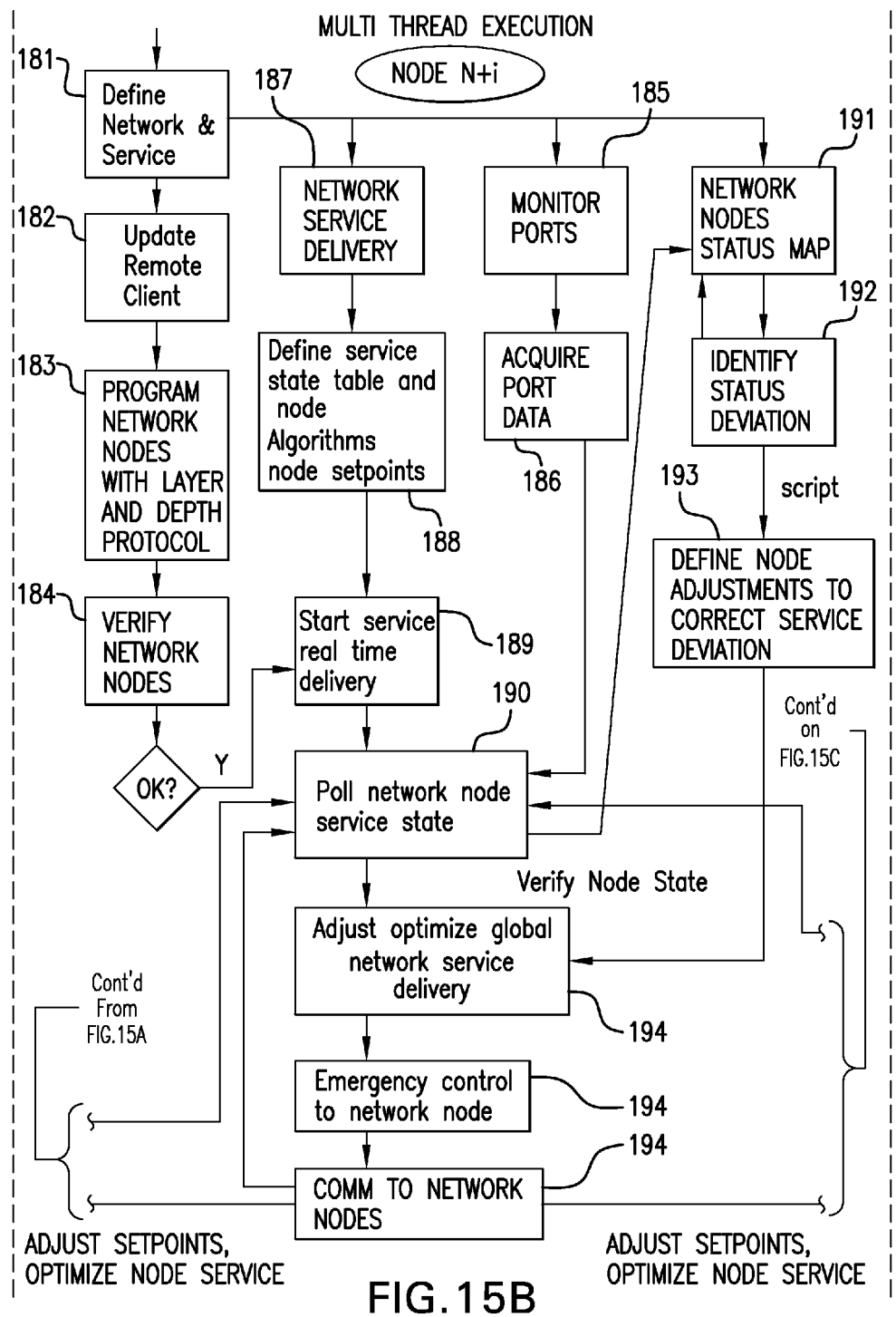
FIG. 15B depicts a second portion of the embodiment of FIG. 15A.
Figure 15C:
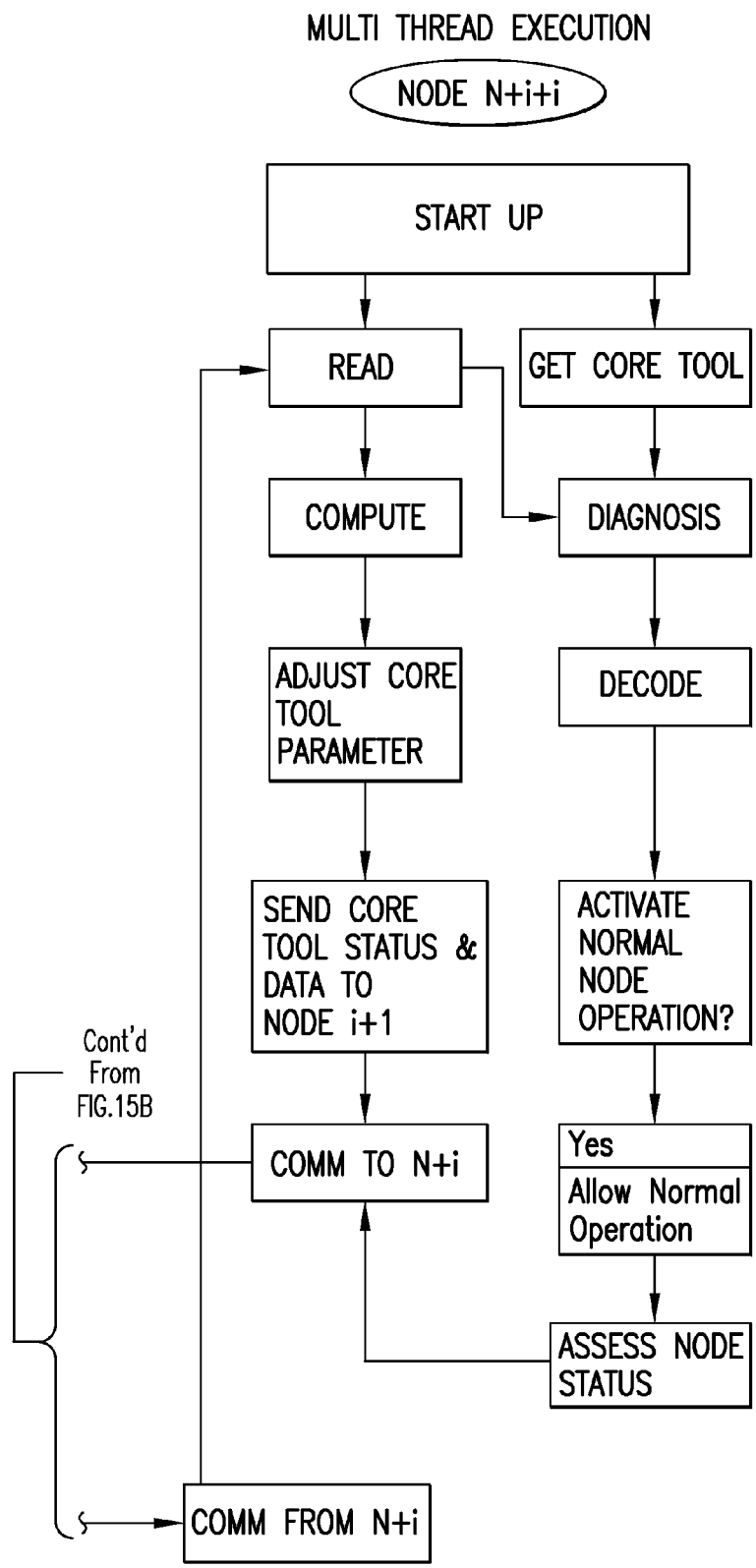
FIG. 15C depicts a third portion of the embodiment of FIG. 15A.

As discussed above, a node in the network can perform routing and/or other functions sequentially relative to other nodes in a communication path. In addition, nodes could coordinate various functions. An example of such coordination is shown in FIGS. 15A, 15B and 15C (collectively referred to as FIG. 15).

FIG. 15 illustrates an exemplary multi-threaded execution of tasks in three different nodes. In this example, node N+i for this service or this service delivery stage moment takes the role of master. Node N and Node N+i+j (left and right sides) have multithreaded parallel tasks that are executed with local closed feedback loop diagnostics, and target service performance execution set points and optimization functions following a prescribed service delivery aspect's operational execution sequence with a unique "Node execution state diagram ID" defined all the time.

In operation, Node N+i (supervisory or Master node in this example) defines the network and service (block 181) and configures other nodes in the network (or network portion) by, e.g., updating remote clients (block 182), programming the other nodes, e.g., Node N and Node N+i+j (block 183) and verifying the other nodes (block 184). The master node also performs other diagnostic functions such as monitoring ports (block 185) and acquiring port data (block 186).

As part of service delivery (block 187), Node N+i defines a service state diagram, table or map (block 188), also referred to as a supervisory "Service Delivery Network State map", which defines the desired state of each node in the network, as well as node algorithms and set points. The service state map is used in conjunction with state information received from the nodes to control, monitor and optimize service delivery operations.

The master node then starts real time service delivery (block 189), and as a part of such delivery, queries or polls the other nodes and its own ports (block 190) for state information. The state information for each node is received, along with a unique identifier, i.e., an operational sequence state diagram identification (ID). The status and ID for each node is used to prepare a complete consolidated state diagram, or "Current Network Service Execution State map" relevant to the service delivery or coordinated service deliveries (block 191). The current state diagram (map) is compared to the desired state diagram (map), and any deviations of the state of a node or nodes from the desired state are identified (block 192). The comparison of deviation from current versus desired supervisory states is used to define appropriate adjustments to the delivery operation using a script (block 193). The adjustments are communicated to the appropriate nodes using, e.g., emergency control functionality (block 194) to perform the network global service (or services) delivery optimization. Some nodes may require faster queries and updates than others, with more frequent command adjustment and operational parameters updates.

Node N+i (supervisory or Master node in this example) sweeps the network nodes requesting status update and "Node execution state diagram ID" to properly update, correct, control and optimize the "Service Delivery Network State MAP". Occasionally, in some cases, a network node state ID requires the identification of previous steps to define a unique history path which is relevant to the control of the particular node.

Figure 16:
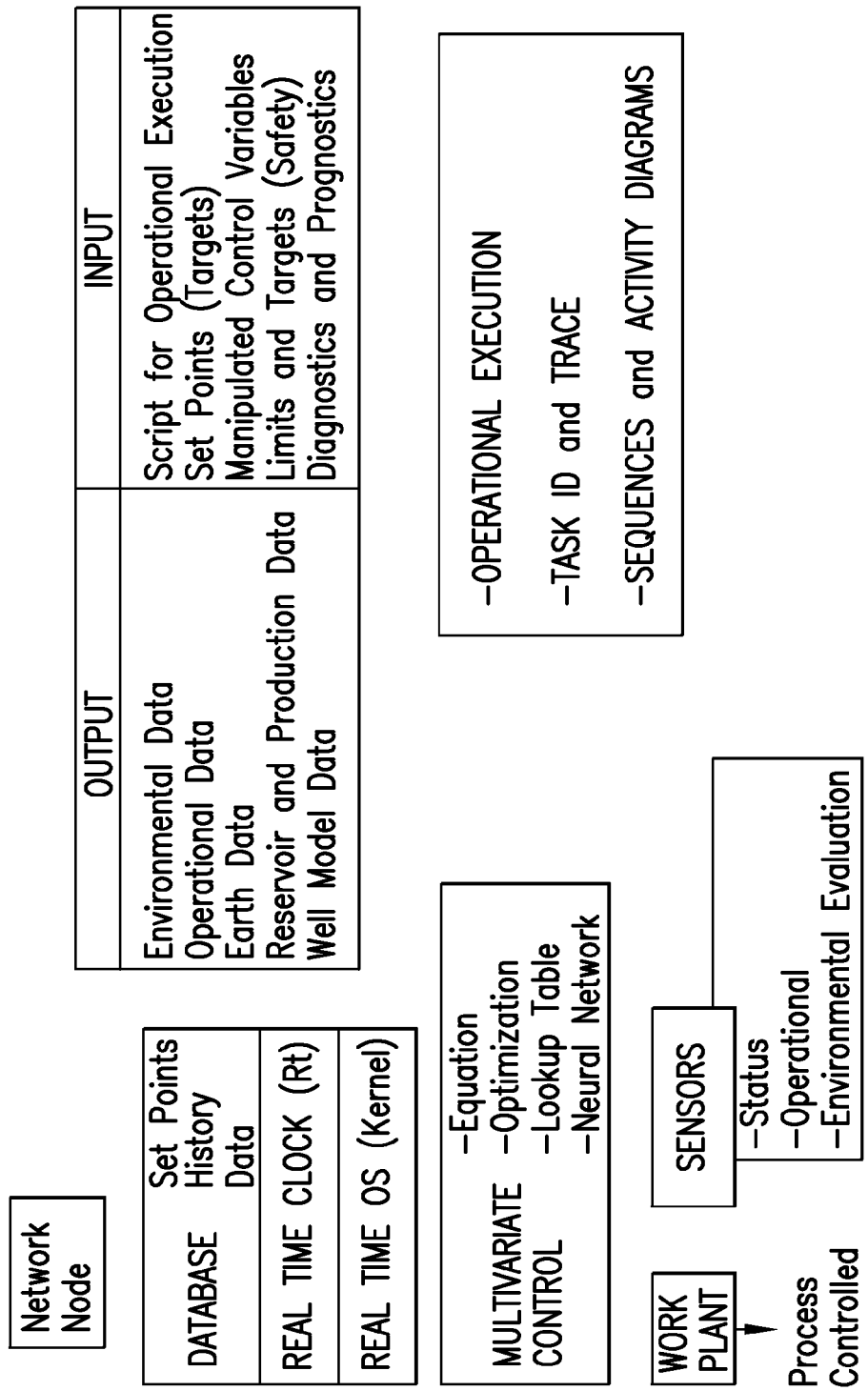
FIG. 16 depicts an example of a network node.

FIG. 16 shows an example of a network node or device. The network node includes various functionalities as illustrated in FIG. 16. For example, the network node includes or is connected to a database, and processes various inputs and outputs. The network node may also include algorithms, programs, scripts or other instructions for controlling other systems or devices, such as drilling systems, pumping systems, completion systems or other energy industry systems (shown in FIG. 16 as plant process). Exemplary control includes multivariate control capabilities.

As discussed above, one or more network devices or nodes may be configured as a controller or include control capabilities. An example of such a controller is a proportional-integral-derivative controller (PID) controller, however the controller is not so limited and may take any suitable form. The PID controller utilizes an algorithm to control a process, such as an energy industry process or operation (e.g., motor control) using tuning parameters referred to as proportional gain, integral gain and derivative gain parameters. The PID is a servo control loop for one input control variable and one output control variable including three correction elements namely proportional, a differentiator and an integrator.

An exemplary control method that can be employed includes an optimization technique such as a H-infinity method. The goals of such control methods may include performance, stability and/or optimization.

Figure 17:
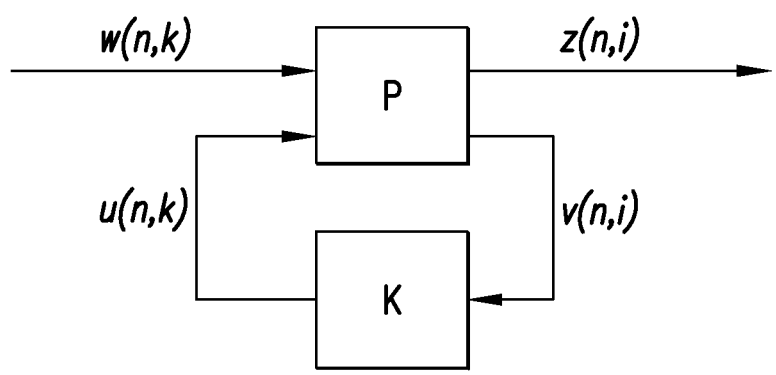
FIG. 17 depicts an example of a control loop used in an exemplary control process.

The H-infinity method uses a short form of the Rosenbrock system matrix. FIG. 17 shows a control loop that may be used in this method. In this control loop, P is the plant or operation to be controlled, and K is a controller in the network, such as a network node or device. The plant (control theory term) described in the network node is the combination of a control process applied to a physical process (actuator, valve, motor, pump, etc.). $v(n,i)$ is a measured plant variable i for a given node n. There could be one or more measured plant variables. The measured input and variables may be any measured signal or value such as a motor control measurement, such as torque current, angular rotational rate, or an environmental measurement such as pressure, vibration or temperature. The well, equipment assembly configuration, environment and reservoir formation around the plant could be considered as part of the plant and therefore contribute with measured variables. $w(n,k)$ is an input reference control signal k (e.g., with noise) for a node n, which is a manipulated variable. There could be one or more input reference control signals. $u(n,k)$ is a manipulated controller output variable k for node n generated by the controller K, There could be one or more manipulated controller output variables. The control variable $z(n,i)$ is an output control or output error signal (e.g., a minimization goal. There could be one or more output control or output error signal variables.

Reference control inputs $(w(n,k))$ and measured plant variable $(v(n,i))$ mentioned above could include variables other than electro-mechanical nature such as linear displacement, angular speed, voltage, current, etc. Environmental conditions (vibration, shock, temperature, pressure,), formation evaluation, drilling dynamics and hydraulics, geology (lithology, rock properties, geology model, etc.), reservoir conditions (pressure, production flow, etc.), plant prognostics and diagnostics functions and models (surface, downhole, subsea). A ruled based algorithm might require adaptive control based on The input and output variables ($w(n,k)$, $u(n,k)$, $z(n,i)$ and $v(n,i)$) may be any measured signal or value representation such as discrete, continuous, integer, digital, analog, true-false logic, digital codes, etc.

The control loop may span all or part of one or more networks described herein. For example, the control loop may span a single device or node with its own plant, a group of nodes in a region (e.g., surface, downhole or subsea) with a network distributed aggregated plant, or a network region (e.g., surface, subsea or downhole). The control loop may span all regions (globally), some regions or one region. In addition, the controller may support concurrently active control loops and/or have multivariate control with coupled channel variables. The network control topology includes hierarchical control levels and aggregated regions of controls that can be easily dynamically configured or adjusted from operational state to state, e.g., to compensate for physical distance or response times required to support execution of various activity sequence lists to accurately and sufficiently control and maintain a defined network state, execute state to state transitions, etc. . . .

A network node or device may perform various control functions for many different energy industry operations. For example, one or more nodes can be used to control various aspects of a drilling operation, such as directional parameters, formation evaluation (e.g., resistivity, acoustic, nuclear, etc.), telemetry, directional drilling package steering unit (accelerometers, magnetometers, gyroscope, etc. . . . ), power generating mud driven turbine, acidizing, fracking, cementing, pumping, injection wells, artificial lift, adjustable production strings ports, surface monitoring, downhole monitoring, control of various tools and/or BHA, and drill bit control. A network device may be incorporated as downhole electronics incorporated in the BHA, drill bit, tool or other downhole components. Networked Electromechanical functions (control plants) and sensors (input control variables) can be embedded or mounted on the drill bit developed to operate as a network node or various network nodes. Such drilling control may use measurements such as vibration or acceleration to control drilling parameters to avoid or control conditions such as stick-slip, backwhirl, shock and vibration and bit bounce.

The node or device can control aspects of a pumping operation, i.e., any energy industry operation that includes pumping various fluids or materials into or out of a borehole. Examples include control of cement pumping, fluid injection control, monitoring, production control, artificial lift control, production sensing and others. For example, a controller or network is connected to or includes a remote client that controls an operation (e.g., via satellite communications), such as a drilling operation or pumping operation, e.g., a cement job, a hydraulic fracturing operation or an acid stimulation.

Figure 18:
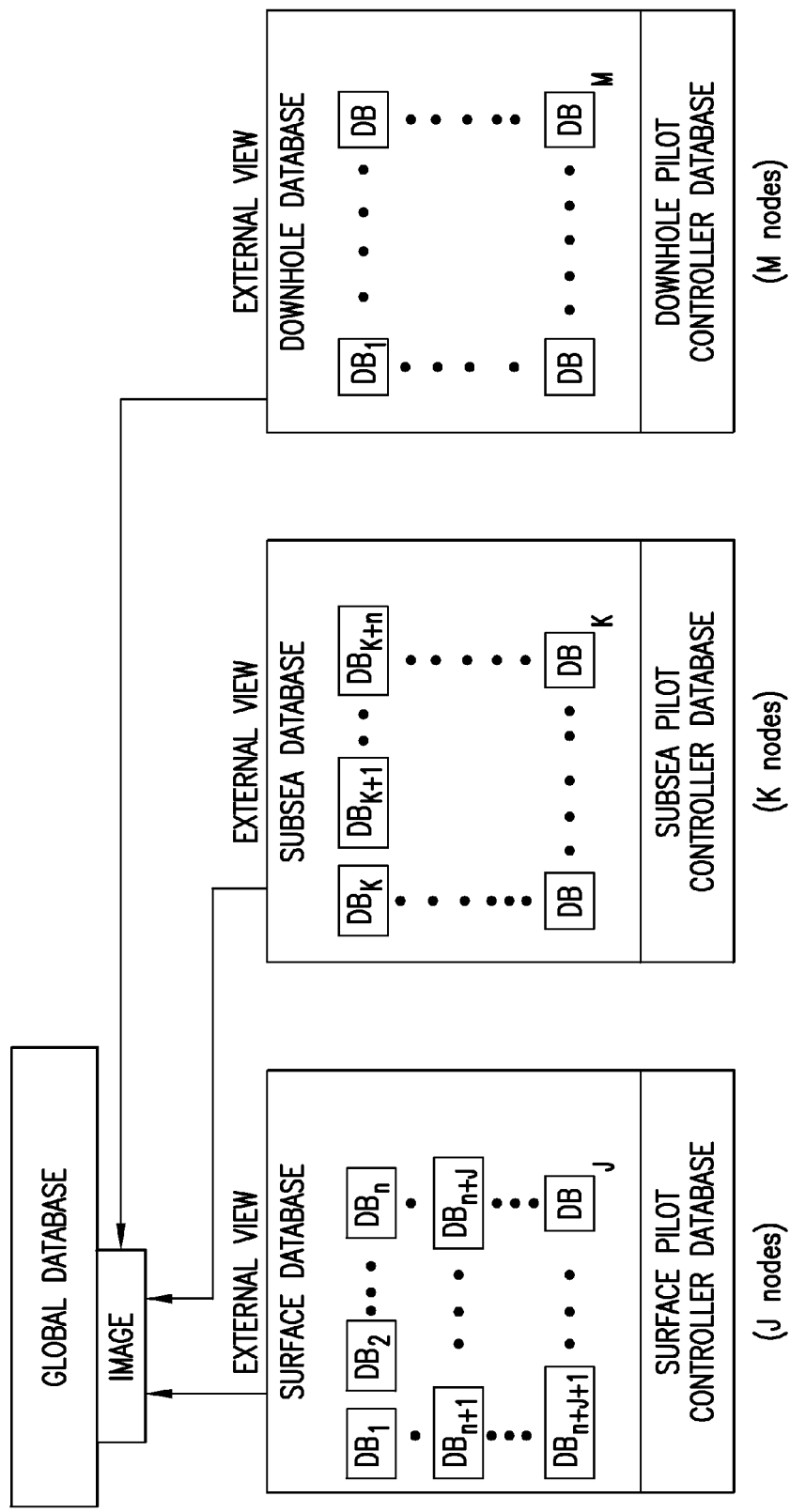
FIG. 18 depicts an exemplary database that can be used in conjunction with a network.

In one embodiment, a network, network subset, node and/or network node as described herein is connected to a database. FIG. 18 shows an exemplary database, which is configured as a global database that can be used to collect and access data from multiple regions. As shown, the global database is connected to surface, subsea and downhole databases. The controller may use the global database to reconstruct and align data by time and location so that various operations can be monitored in real-time or at any other time. In this way, large numbers of spatially separated operations can be monitored.

The database can be implemented in a single node or concatenated and distributed across the network including one or more of the following features implemented:

1. Temporal and Spatial Database—data in this database is tagged with location (space) and time of observation (can be synchronized to real-time across a region or the global network).
2. Real Time—data once archived is promptly available for process servo control loops.
3. Operational Database—data in this database is organized to facilitate access and data manipulation, to provide efficiency and organization.
4. Federated Database System—formed with distributed and imaged heterogeneous database systems with an integrated conceptual view.

5. Distributed Database—such as database provides network navigation for data storage and retrieval.
6. Active Database—an event driven database with control process responses.
7. Relational Database—large shared databanks with data organized with relational tags and linked with additional match keys.

The above disclosed techniques provide several advantages. Embodiments described herein provide an efficient and effective system for communicating with different tools in a borehole that operate using different protocols. The embodiments also provide a way to connect tools or tool systems in a borehole string, as well to expand tool assemblies without significant difficulty or re-wiring. Embodiments also allow for flexibility in allowing for support of multiple tool protocols, and in allowing for a variety of configurations in multiple subsurface service applications.

In support of the teachings herein, various analysis components may be used, including a digital and/or an analog system. For example, embodiments such as the system 10, downhole tools, hosts and network devices described herein may include digital and/or analog systems. Embodiments may have components such as a processor, storage media, memory, input, output, wired communications link, user interfaces, software programs, signal processors (digital or analog), signal amplifiers, signal attenuators, signal converters and other such components (such as resistors, capacitors, inductors and others) to provide for operation and analyses of the apparatus and methods disclosed herein in any of several manners well-appreciated in the art. It is considered that these teachings may be implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The terms "first," "second" and the like do not denote a particular order, but are used to distinguish different elements.

While one or more embodiments have been shown and described, modifications and substitutions may be made thereto without departing from the spirit and scope of the invention. Accordingly, it is to be understood that the present invention has been described by way of illustrations and not limitation.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system for communicating with subsurface components, comprising:
   a surface host connected to a subsurface location;
   a subsurface host connected to the surface host by a communication link, the subsurface host configured to communicate with the surface host using a communication protocol; and
   a plurality of tools configured to be disposed in a borehole in an earth formation, the plurality of downhole tools communicatively coupled to the subsurface host via a communication network;
   wherein the communication network is divided into a plurality of network subsets, each network subset of the plurality of network subsets including one or more downhole tools, the plurality of network subsets including a first network subset and a second network subset, all of the one or more downhole tools in the first network subset configured to communicate using a first protocol, all of the one or more downhole tools in the second network subset configured to communicate using a second protocol that is different than the first protocol; and
   wherein the surface host is configured to generate a message to be transmitted to the subsurface host, the message including a first set of data structured according to the first protocol and a second set of data structured according to the second protocol, the second set of data encapsulated within the first set of data so that the first set of data is removable from the message without affecting a structure of the second set of data.

2. The system of claim 1, wherein the surface host and the subsurface host form a surface communication network subset, the subsurface host is configured to receive data directed to a downhole tool and route the data to a network subset that includes the downhole tool.

3. The system of claim 2, wherein the network device includes a processor configured to receive the data from the subsurface host, remove the data from the message and transmit the data to the downhole tool according to a protocol used by the downhole tool.

4. The system of claim 1, wherein the network forms a communication path that connects the plurality of network subsets.

5. The system of claim 4, wherein the surface host, the subsurface host and the plurality of network devices each form a node in the communication network, one of the nodes configured as a master node, the master node configured to query the nodes in the network for state information during network operation, generate a state diagram representing the state of each node, compare the state diagram to a supervisory state diagram, and control operation of the nodes based on the comparison.

6. The system of claim 4, wherein the network device includes a processor configured to:
   receive the message from one of the subsurface host and a preceding network subset in the communication path, and extract data from the message; and based on the data being directed to a downhole tool located further along the communication path, generate another message including the data and routing the generated message to an immediately succeeding subset.

7. The system of claim 6, wherein the network devices are operably organized into a plurality of depth levels, each network device configured to receive and transmit data to and from one or more network devices associated with an adjacent depth level.

8. The system of claim 4, wherein the second network subset is located subsequent to the first network subset in the communication path.

9. The system of claim 8, wherein each network subset includes a network device configured to receive data and transmit data to an intended tool, the first network subset including a first network device configured to remove the first set of data and transmit the second set of data to a second network device of the second network subset.

10. The system of claim 2, wherein the network device is configured to communicate with the one or more downhole tools in the network subset using a first layer of the network, and the network device is configured to communicate with other network subsets using a second layer of the network that is different than the first layer.

11. A method of communicating with subsurface components, comprising:
sending a message from a surface host to a subsurface host over a communication link, the data sent to the subsurface host using a communication protocol, the data intended for a downhole tool of a plurality of downhole tools, the plurality of downhole tools configured to be disposed in a borehole in an earth formation, the plurality of downhole tools communicatively coupled to the subsurface host via a communication network the communication network divided into a plurality of network subsets, each network subset of the plurality of network subsets including one or more downhole tools, the plurality of network subsets including a first network subset and a second network subset, all of the one or more downhole tools in the first network subsets configured to communicate using a first protocol, all of the one or more downhole tools in the second network subset configured to communicate using a second protocol that is different than the first protocol;
receiving the message at the subsurface host, the message including a first set of data structured according to the first protocol and a second set of data structured according to the second protocol, the second set of data encapsulated within the first set of data, and routing the message to a network device of the first network subset; and
receiving the message by the network device, removing the first set of data from the message without affecting a structure of the second set of data, and transmitting the message to the second network subset.

12. The method of claim 11, wherein the surface host and the subsurface host form a surface communication network subset, and the subsurface host routes the message to at least one subset based on a subset identification associated with the data.

13. The method of claim 11, wherein the network forms a communication path that connects the plurality of network subsets.

14. The method of claim 13, wherein the subsurface host, the surface host and the plurality of network devices each form a node in the communication network, one of the nodes configured as a master node, the method including querying the nodes in the network for state information by the master node during network operation, generating a state diagram representing the state of each node, comparing the state diagram to a supervisory state diagram, and controlling operation of the nodes based on the comparison.

15. The method of claim 14, wherein routing the data includes:
receiving the message from one of the subsurface host and a preceding network subset at a processor in a current network subset,
extracting data from the message; and
based on the data being directed to a downhole tool located further along the communication path, generating another message including the data and routing the generated message to an immediately succeeding subset.

16. The method of claim 13, wherein the second network subset is located subsequent to the first network subset in the communication path.

17. The method of claim 16, wherein each network subset includes a network device configured to receive data and transmit data to an intended tool, the first network subset including a first network device configured to remove the first set of data and transmit the second set of data to a second network device of the second network subset.

18. The method of claim 1, wherein the network device is configured to communicate with the one or more downhole tools in the network subset using a first layer of the network, and the network device is configured to communicate with other network subsets using a second layer of the network that is different than the first layer.

19. The method of claim 18, wherein the first network layer is a link layer corresponding to Open Systems Interconnection (OSI) Layer 2, and the second network layer is a network layer corresponding to OSI Layer 3.

* * * * *